United States Patent
Danninger et al.

(10) Patent No.: US 10,875,261 B2
(45) Date of Patent: Dec. 29, 2020

(54) PRODUCTION SYSTEM FOR LAYING FIBRE TAPES

(71) Applicant: Fill Gesellschaft m.b.H., Gurten (AT)

(72) Inventors: Norbert Danninger, Andorf (AT); Gregor Wittmann, Pattigham (AT)

(73) Assignee: Fill Gesellschaft m.b.H., Gurten (AT)

( * ) Notice: Subject to any disclaimer, the term of this patent is extended or adjusted under 35 U.S.C. 154(b) by 231 days.

(21) Appl. No.: 15/774,361

(22) PCT Filed: Oct. 18, 2016

(86) PCT No.: PCT/EP2016/074976
§ 371 (c)(1),
(2) Date: May 8, 2018

(87) PCT Pub. No.: WO2017/084823
PCT Pub. Date: May 26, 2017

(65) Prior Publication Data
US 2019/0224928 A1  Jul. 25, 2019

(30) Foreign Application Priority Data

Nov. 16, 2015  (AT) ............... A 50972/2015

(51) Int. Cl.
*B29C 70/38* (2006.01)
*B29C 70/54* (2006.01)
*B29C 31/08* (2006.01)

(52) U.S. Cl.
CPC .......... *B29C 70/386* (2013.01); *B29C 31/085* (2013.01); *B29C 70/543* (2013.01); *B29C 70/545* (2013.01)

(58) Field of Classification Search
CPC .... B29C 70/386; B29C 70/543; B29C 70/545
See application file for complete search history.

(56) References Cited

U.S. PATENT DOCUMENTS 4,356,054 A * 10/1982 Gotz ................. B21D 43/287
                                            100/325
4,569,716 A *  2/1986 Pugh ................. B29C 65/1464
                                            156/510

(Continued)

FOREIGN PATENT DOCUMENTS

CN      1364137 A    8/2002
CN    204585872 U    8/2015

(Continued)

OTHER PUBLICATIONS

International Search Report of PCT/EP2016/074976, dated Jan. 26, 2017.

(Continued)

*Primary Examiner* — Philip C Tucker
*Assistant Examiner* — John Blades
(74) *Attorney, Agent, or Firm* — Collard & Roe, P.C.

(57) ABSTRACT

The invention relates to a production system (1) for laying fiber tapes (2), said production system (1) comprising: a laying device (5) having at least two roll-out devices (9); an application device (6) having an application surface (32) for receiving the fiber tape (2), wherein the fiber tape (2) can be rolled out in strips onto the application surface (32); a manipulation device (7) for manipulating the fiber tape (2) applied to the application device (6), wherein the manipulation device (7) has a receiving surface (59) for receiving the fiber tape (2). The application surface (32) of the application device (6) is divided into at least two sub-regions (35) when seen over the width (34) of the application device (6), wherein each of the sub-regions (35) is assigned to a roll-out device (9) and wherein the at least two sub-regions (35) of the application surface (32) and the respective related roll-out device (9) of the laying device (5) can be moved relative to one another in the longitudinal extension (33) of (Continued)

Figure 1:
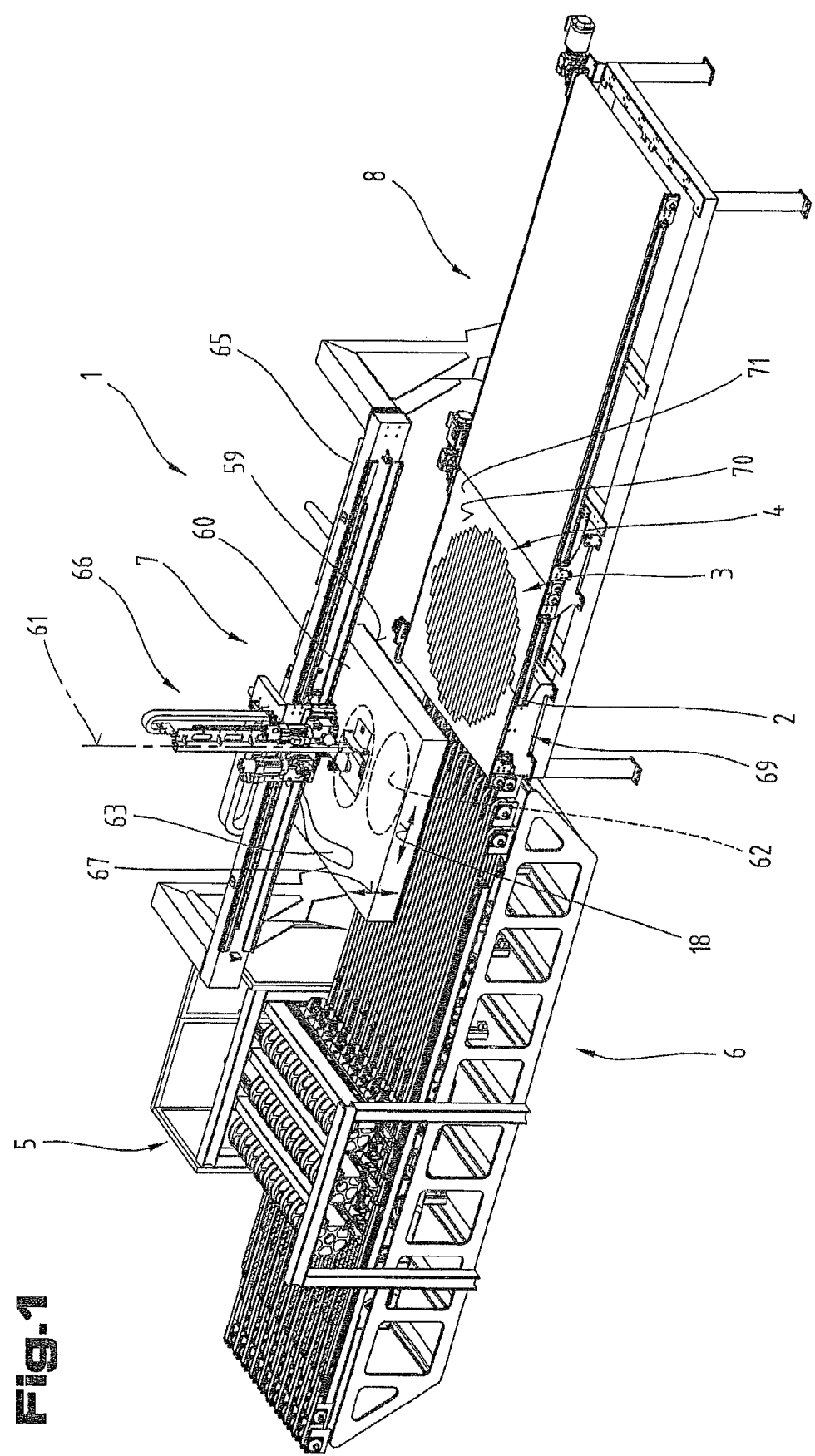

the application surface (32) independently of the further roll-out device (9) and the further sub-region (35).

36 Claims, 12 Drawing Sheets

(56) References Cited

U.S. PATENT DOCUMENTS

| | | | |
|---|---|---|---|
| 6,959,747 B2* | 11/2005 | Salinas | B29C 53/66 |
| | | | 156/169 |
| 7,213,629 B2 | 5/2007 | Ledet et al. | |
| 2005/0039843 A1* | 2/2005 | Johnson | B29C 70/32 |
| | | | 156/175 |
| 2010/0193103 A1 | 8/2010 | McCowin | |
| 2014/0299266 A1 | 10/2014 | Borgmann et al. | |
| 2017/0008197 A1 | 1/2017 | Baeurle et al. | |

FOREIGN PATENT DOCUMENTS

| | | |
|---|---|---|
| DE | 33 31 494 A1 | 3/1985 |
| DE | 10 2014 201 060 A1 | 7/2015 |
| DE | 10 2014 101 445 A1 | 8/2015 |
| WO | 2014/140146 A1 | 9/2014 |

OTHER PUBLICATIONS

Letter of Austrian Patent Attorney to European Patent Office dated Sep. 13, 2017 in PCT/EP2016/074976, with English translation of relevant parts.

\* cited by examiner

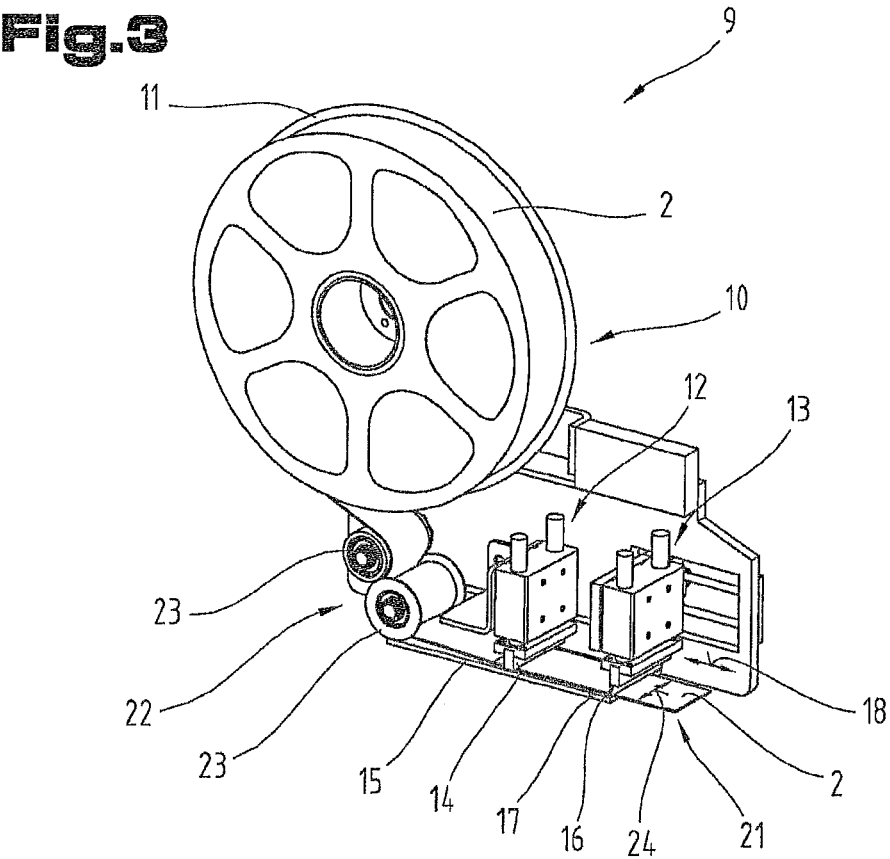
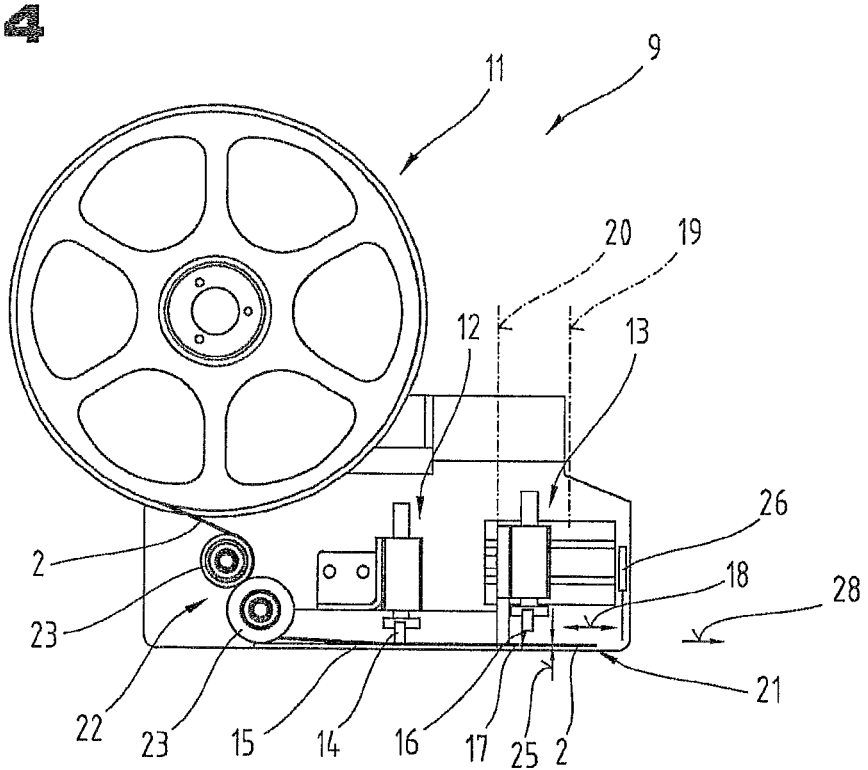

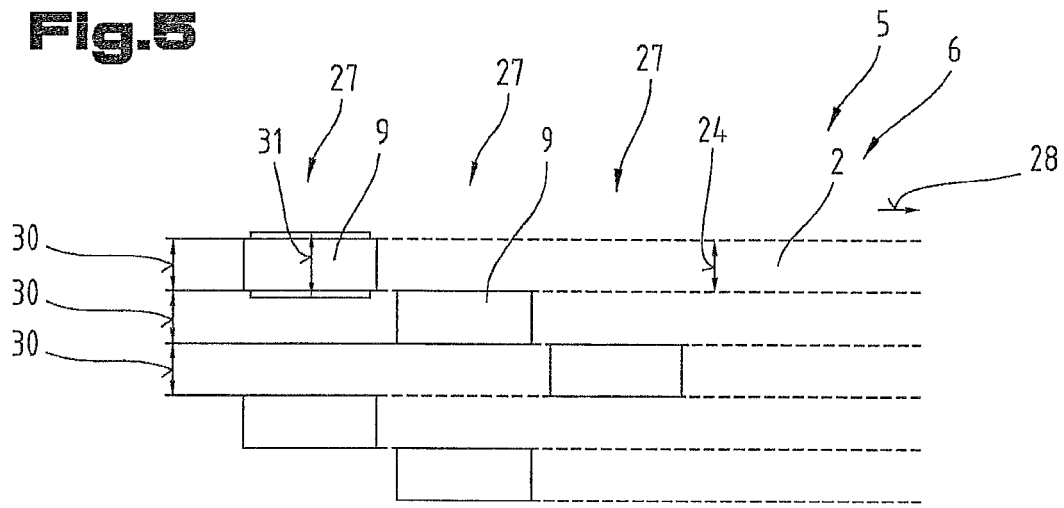
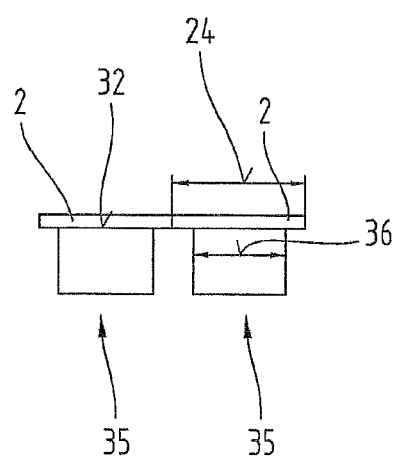
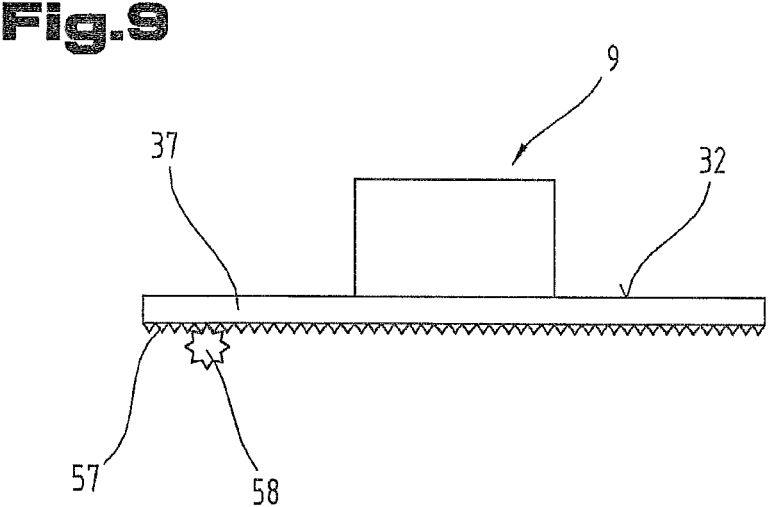

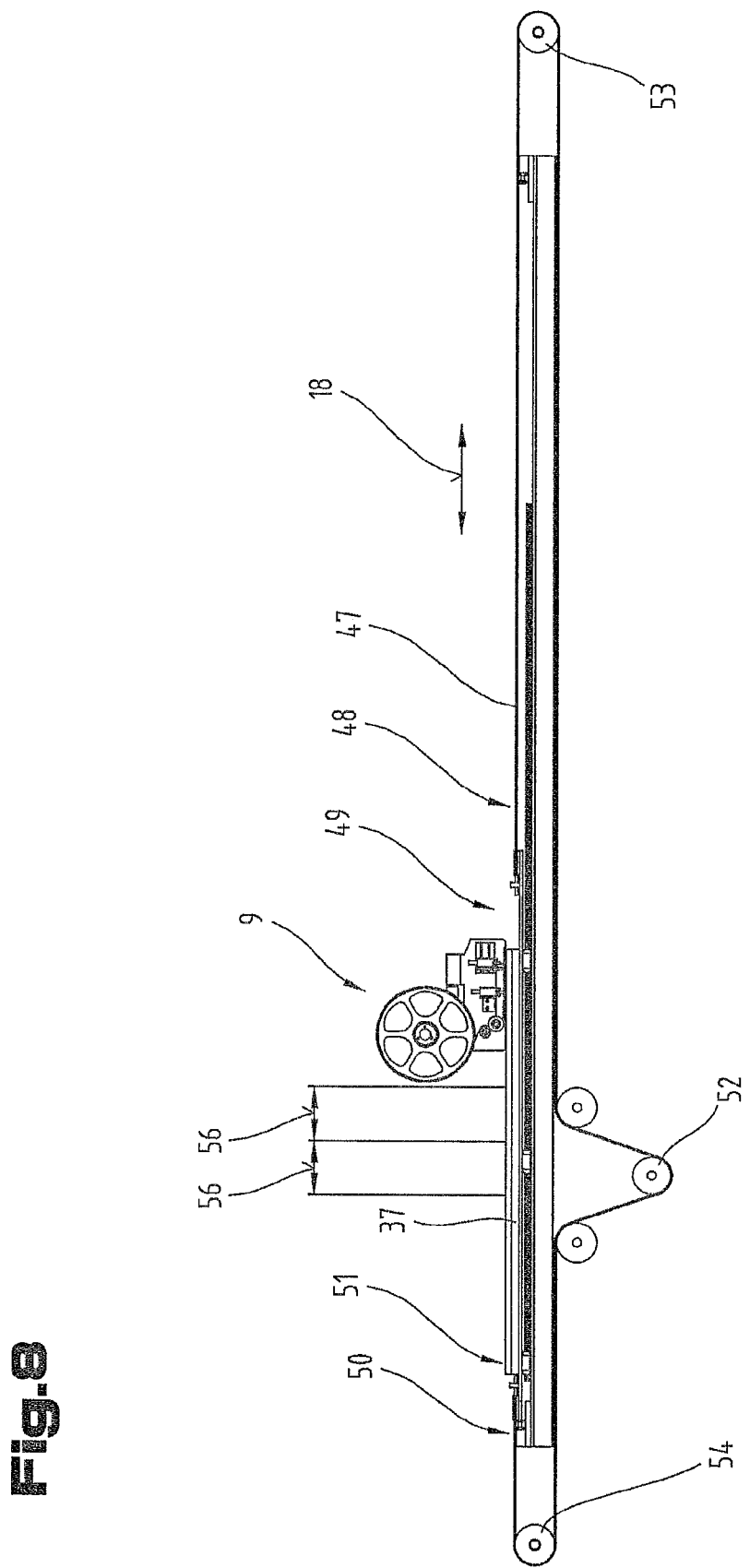

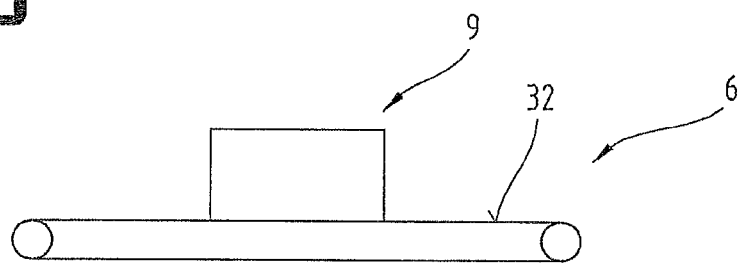
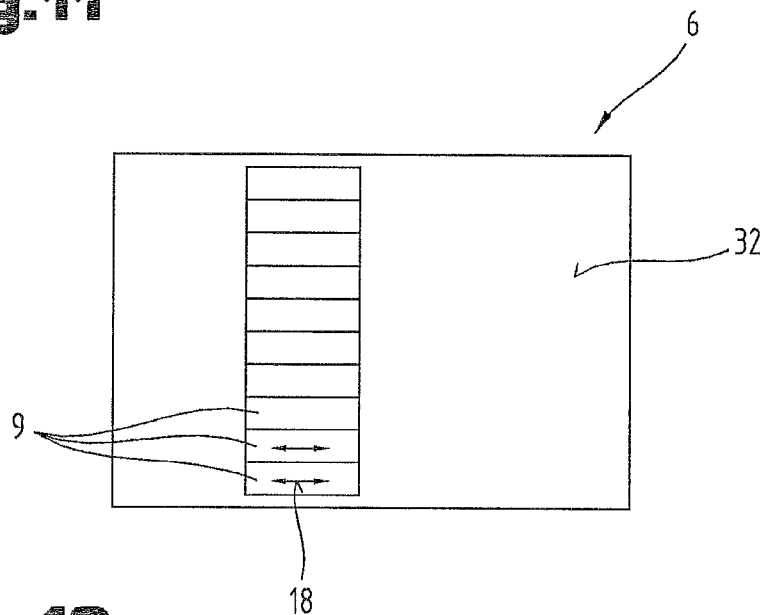
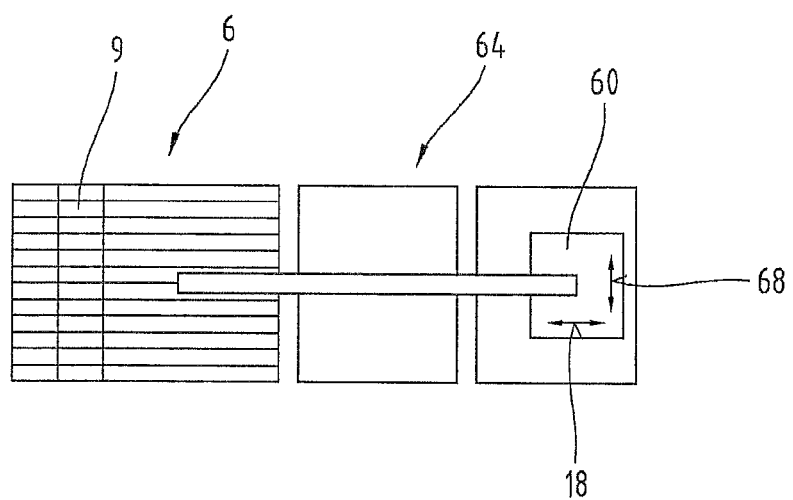

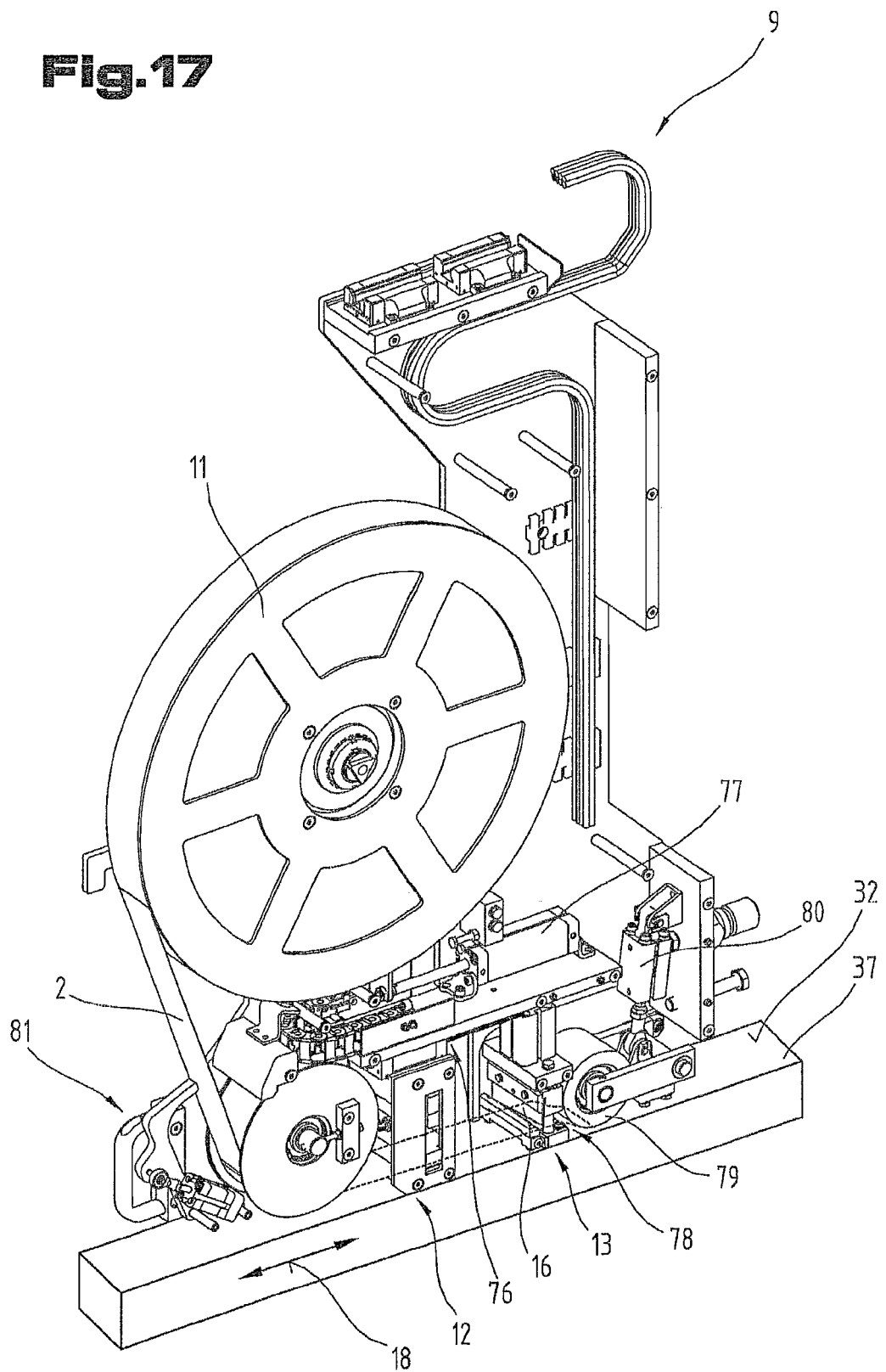

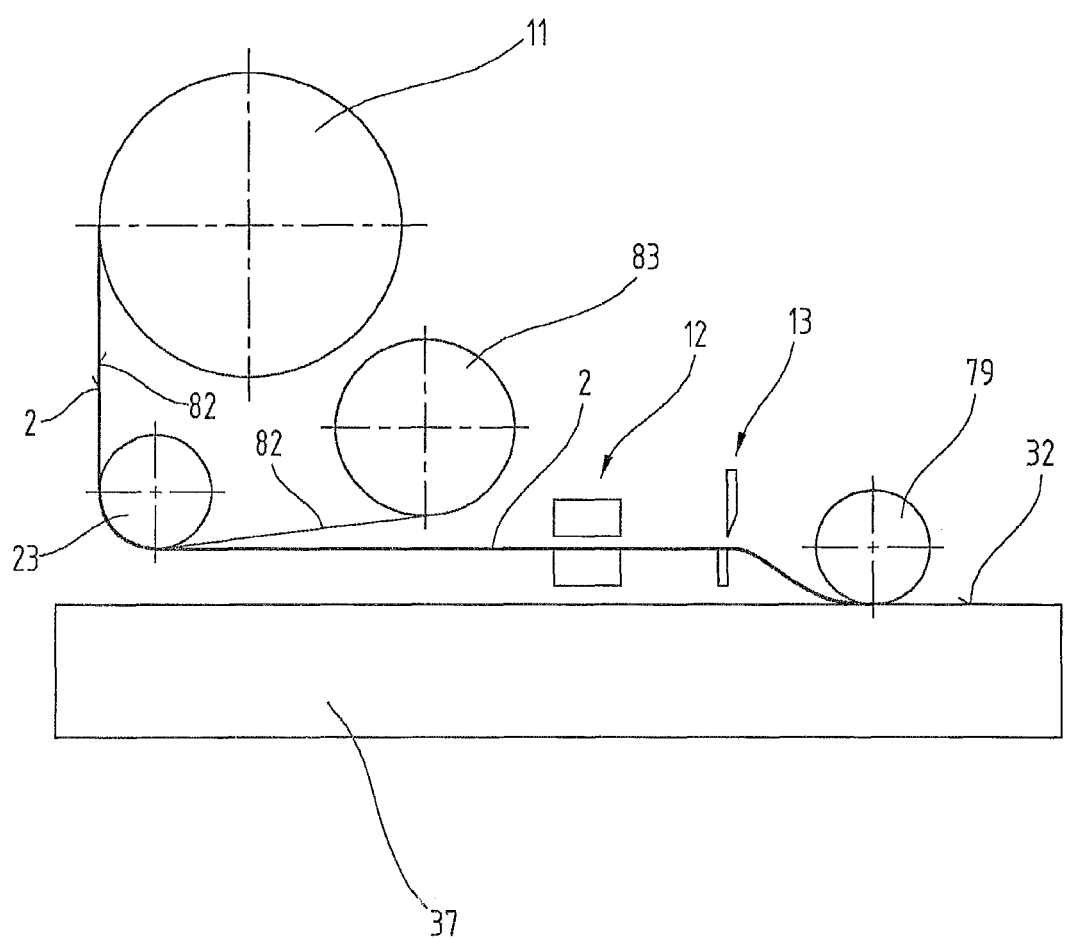

PRODUCTION SYSTEM FOR LAYING FIBRE TAPES

CROSS REFERENCE TO RELATED APPLICATIONS

This application is the National Stage of PCT/EP2016/074976 filed on Oct. 18, 2016, which claims priority under 35 U.S.C. § 119 of Austrian Application No. A 50972/2015 filed on Nov. 16, 2015, the disclosure of which is incorporated by reference. The international application under PCT article 21(2) was not published in English.

The invention relates to a production system for laying fiber tapes and a method for laying fiber tapes.

DE 10 2014 101 445 A1 discloses a method for building a laminate and an associated tape laying device. A tape to be laid provided with binder and/or matrix materials is fed to a laying device. The fed tape is laid by means of the laying device until the tape structure made up tapes laid next to one another and on top of one another corresponds to the laminate and adjacently laid tape defines a tape layer of a tape structure. The tape structure is fed to an ultrasound excitation device and the binder and/or matrix materials are successively plasticized and the individual tape layers thus joined to one another.

DE 10 2014 201 060 A1 discloses a fiber laying machine for producing laid fiber scrims. The fiber laying machine has a tool table for positioning a mold which can be moved linearly by means of an x-carriage in an x-direction and pivoted about a vertical pivot axis. Disposed above the tool table is a fiber laying head which can be moved linearly and transversely to the x-direction by means of a y-carriage.

US 2010/0193103 A1 discloses a fiber laying method whereby several laying vehicles which can be moved independently of one another are provided, each having a raw material roll with a fiber tape received thereon. The laying vehicles can be moved freely on the surface on which they are intended to lay the fiber tapes and the position and/or movement of the laying vehicles is/are predefined via a central control system.

US 2014/0299266 A1 discloses a method for producing composite components by means of a fiber placement system. The fiber placement system has a nip roller drive system by means of which individual material webs can be unreeled from a material roll. By means of the nip roller drive system, each of the material webs is fed forwards beyond a cutting mechanism and on into its respective guide tray of a material transfer station. After each material web has been moved by the desired distance into its respective guide tray, the vacuum system of the respective guide tray is activated in order to fix the material web and the material web is then cut by means of the cutting mechanism.

The disadvantage of the devices known from DE 10 2014 101 445 A1 and DE 10 2014 201 060 A1 is that the fiber laying process using devices of this design requires a long process time.

The objective of this invention was to overcome the disadvantages of the prior art and propose a device and a method by means of which the fiber laying process and/or creation of tape structures is made easier.

This objective is achieved by a device and a method as defined in the claims.

The invention proposes a production system for laying fiber tapes. The production system comprises:
 a laying device having at least two roll-out devices, which roll-out devices respectively comprise a receiving device for receiving a raw material roll and a cutting unit for cutting the fiber tape;
 an application device having an application surface for receiving the fiber tape unreeled from the raw material roll, the application surface of the application device and the roll-out device of the laying device being movable relative to one another in the longitudinal extension of the application surface so that the fiber tape can be rolled out in strips onto the application surface, and
 the application surface of the application device is divided into at least two sub-regions when seen over the width of the application device, and each of the sub-regions is assigned to a roll-out device and the at least two sub-regions of the application surface and the respective related roll-out device of the laying device can be moved relative to one another in the longitudinal extension of the application surface independently of the other roll-out device and the other sub-region.

The production system may further comprise the following:
 a laying device having at least two roll-out devices, which roll-out devices respectively comprise a receiving device for receiving a raw material roll, a cutting unit for cutting the fiber tape and a clamping unit for clamping the fiber tape;
 an application device having an application surface for receiving the fiber tape unreeled from the raw material roll, and the application surface of the application device and/or the roll-out device of the laying device comprise a linear guide so that the application surface of the application device and the roll-out device of the laying device can be moved relative to one another in the longitudinal extension of the application surface so that the fiber tape can be unreeled in strips onto the application surface, and
 the application surface of the application device is divided into at least two sub-regions when seen over the width of the application device, and each of the sub-regions is assigned to a roll-out device and the at least two sub-regions of the application surface and the respective related roll-out device of the laying device can be moved relative to one another in the longitudinal extension of the application surface independently of the other roll-out device and the other sub-region, and the cutting unit and/or the clamping unit are mounted on the roll-out device so as to be movable by means of a linear guide so that the cutting unit and the clamping unit can be moved relative to one another, as a result of which a fiber tape clamped in the clamping unit can be pushed out forwards beyond the cutting unit to form a free end which can be secured to the application surface so as to be unreeled from the raw material roll by means of the application surface.

The design of the production system proposed by the invention has an advantage in that several fiber tapes can be unreeled simultaneously next to one another by means of the production system and the individual fiber tapes may be of a different length and can be freely positioned relative to one another. This results in an increase in the flexibility of the production system. Improved laid structures can be produced as a result.

A manipulation device may be provided for manipulating the fiber tape applied to the application device and the manipulation device has a receiving surface for receiving the fiber tape, by means of which the fiber tape applied to the application surface can be received by the manipulation device and transferred to another part of the production system. The advantage of this is that the flexibility of the production system can be increased as a result of this feature.

It may also be of advantage to provide a stacking device having an application surface for receiving the fiber tape on which the fiber tape transferred by the manipulation device can be stacked, and the stacking device is physically disposed at a distance from the application device. The advantage of this is that the process time for producing laid structures from fiber tapes can be shortened because the individual fiber tapes can be unreeled and positioned in a first method step and the individual layers can be laid one above the other and/or joined to one another in a second method step.

Furthermore, the application surface of the stacking device may be of an air-permeable design and can be subjected to a negative pressure so that the fiber tape applied to the application surface can be fixed thereon. The advantage that can be achieved as a result of this feature is that the fiber tape can be positioned in an exact position on the application surface, thereby preventing the fiber tape from slipping relative to the application surface.

Furthermore, the application surface of the application device is of an air-permeable design and can be subjected to a negative pressure so that the unreeled fiber tape can be fixed on the application surface. As a result, the fiber tape can be fixed on the application surface to enable the fiber tape to be unreeled from the roll-out device. What can be achieved by this in particular is that the raw material roll does not need to have a separate drive. The raw material roll can be braked to prevent any excessive unreeling of fiber tape.

Also of advantage is another feature whereby the receiving surface of the manipulation device is of an air-permeable design and can be subjected to a negative pressure so that the fiber tape can be fixed on the receiving surface. This obviates the need for any complex fixing device on the manipulation device. What this achieves in particular is that a range of different fiber tape layers having different contours can be received and manipulated by the manipulation device.

Based on another embodiment, a clamping unit may be provided on the laying device for fixing a fiber tape disposed on the raw material roll and the cutting unit of the roll-out device can be moved relative to the clamping unit of the roll-out device, and the cutting unit can be moved parallel with the application surface of the application device between an extracted cutting position and a retracted unreeling position. The advantage of this is that the fiber tape can be cut off in the cutting position and after the cutting unit has been retracted into the unreeling position, the fiber tape extends out from the cutting unit and can therefore be fixed on the application surface of the application device.

Alternatively, a clamping unit for fixing a fiber tape disposed on the raw material roll may be provided on the laying device and the clamping unit is received on the laying device so that it can be moved by means of a linear guide relative to the cutting unit so that the fiber tape clamped in the clamping unit can be pushed out beyond the cutting unit to form a free end of fiber tape which can be fixed on the application surface of the application device. As a result of this feature, the fiber tape can be unreeled from the raw material roll.

It may also be of practical advantage if the cutting unit of the roll-out device is provided in the form of a guillotine, and the cutting unit comprises a cutting blade and a counterholder which can be moved together relative to the clamping unit of the roll-out device. The advantage of this is that such a cutting unit can be easily fitted and delivers a good cutting result.

Furthermore, several roll-out devices may be provided on the laying device in rows. The advantage of this is that several fiber tapes can be disposed adjacent to one another on the laying device.

Furthermore, the laying device may comprise a guide rail on which the roll-out devices may be disposed in rows and a row of roll-out devices can be respectively pulled sideways out of the laying device by means of the guide rail. The advantage of this is that in order to change the raw material rolls received on the roll-out devices, the roll-out devices can be moved out of the interior of the laying device, thereby improving accessibility, and the process of changing the raw material rolls can be made easier.

Based on one particular feature, the roll-out devices have a module width which corresponds to and/or is less than the width of the fiber tape and, based on a serial arrangement of the roll-out devices in several rows, the roll-out devices are disposed at an n-times distance of the module width from one another where n corresponds to the number of rows−1. The advantage of this is that the individual fiber tapes can be placed close together and the serial arrangement in several rows means that the individual fiber tapes may have a small width.

Based on another advantageous embodiment, the at least two sub-regions of the application surface of the application device can be moved relative to one another and independently of one another in the longitudinal extension of the application surface and the roll-out devices are disposed on the laying device in a stationary arrangement relative to the longitudinal extension of the application surface. The advantage of this is that the roll-out devices, which are the heavier, do not have to be moved in order to unreel the fiber tape and instead, the application surface of the application device is moved in order to effect a relative movement between the application surface and roll-out device. An additional advantage of these features resides in the fact that the media supplies of the roll-out devices may be based on a stationary design.

In particular, it may be of advantage if each sub-region of the application surface of the application device is disposed on a separate application profile which can be moved in a horizontal direction relative to a base frame of the application device and the application profile is coupled with the base frame by means of a linear guide. Such application profiles can be easily and efficiently designed to receive the fiber tape.

It may also be of practical advantage if the application profile is connected to a toothed belt and a first end section of the toothed belt is connected to a first end section of the application profile and a second end section of the toothed belt is connected to a second end section of the application profile and the application profile and toothed belt form a continuous loop and the toothed belt engages with a drive unit. The advantage of this is that there is a large space within which the application profile can be moved by means of the toothed belt and/or by means of the drive unit and the application profile can be positioned with a high degree of accuracy.

Based on an alternative embodiment, the application profile may have toothing and is driven by means of a gearwheel.

Furthermore, a width of a sub-region of the application surface of the application device may be the same size as or slightly smaller than the width of the fiber tape to be processed. The advantage of this is that the fiber tape can be received on the sub-regions of the application surface and individual adjacently disposed fiber tapes may lie close together and the fiber tapes may extend across the application surface transversely to the direction of movement in order to achieve this.

Furthermore, orifices may be provided in the application surface of the application device which are air-permeable and can be coupled with a device for generating a negative pressure. The advantage of this is that a negative pressure can be applied as a means of fixing the fiber tape on the application surface.

Also of advantage is a feature whereby the sub-regions of the application surface of the application device are divided into longitudinal sub-regions as viewed in the longitudinal extension and a negative pressure can be selectively applied to the longitudinal sub-regions. The energy efficiency of the production system can be improved as a result because the provision of air suction where not needed is avoided for the most part.

Based on another embodiment, it is possible for the receiving surface of the manipulation device to be mounted so as to be rotatable about its vertical axis. As a result of this, the individual layers of fiber tapes received by the application device can be stacked in a predefined orientation with respect to one another. This enables a laid structure reinforced in several directions to be created.

It may also be of practical advantage if the manipulation device has a heating element which is integrated in the receiving surface or acts on it. The advantage of this is that the individual layers of fiber tapes can be partially melted and thus joined to one another.

Furthermore, the manipulation device may have a feeding unit for feeding in an additive, such as a resin. The advantage of this is that the laid structure can be provided with an additive which improves the thermal and/or mechanical properties of the laid structure.

The stacking device may further comprise a belt conveyor and the application surface is provided on a continuously circulating conveyor belt of the belt conveyor. The advantage of this is that after stacking the individual fiber tape layers to form a laid structure, this laid structure can be conveyed by the belt conveyor to another station.

Based on one particular embodiment, it is possible to provide a provisioning station from which an additional layer such as a reinforcing mat waiting in readiness can be picked up by means of the manipulation device and transferred to the application device or to the stacking device. The advantage of this is that the laid structure can be reinforced with additional layers and the mechanical and/or thermal properties of the laid structure thus improved.

Furthermore, the application surface of the application device may be curved in at least certain regions. The advantage that can be achieved as a result of this feature is that the individual fiber tape layers may have a formed surface and thus be prepared for pressing 3D fiber meshes. In particular, the fiber tape can also be draped as a result of this feature.

Furthermore, the receiving surface of the manipulation device may be curved in at least certain regions and in particular the receiving surface is divided into several sub-regions which can be moved relative to one another, thereby enabling the curvature of the receiving surface to be moved. The advantage of this is that the manipulation device can be adapted to the surface of the application device. In particular, due to the possibility of being able to move the manipulation device, it can be flexibly adapted to the application device.

Furthermore, a downholder roll may be provided, by means of which the fiber tape can be pressed against the application surface of the application device. The advantage that can be achieved as a result of this feature is that the fiber tape can be pressed against the application surface and thus adheres to the application surface, as a result of which the fiber tape can be pulled off the raw material roll by moving the application surface.

Furthermore, the application device may have a first machine side having several application profiles and roll-out devices co-operating therewith and a second machine side having several application profiles and roll-out devices co-operating therewith, and the application profiles of the first machine side and the application profiles of the second machine side can be moved so that they engage with one another in a meshing arrangement in a machine center. The advantage of this is that the roll-out devices can be split between the first and the second machine sides to make sufficient space available. The unreeled fiber tapes can then be picked up in the machine center by means of the manipulation device.

With regard to the method for laying fiber tapes, the method comprises the following method steps:
  providing a fiber tape on a laying device having several roll-out devices, which roll-out devices respectively comprise a receiving device for receiving a raw material roll, a clamping unit for fixing a fiber tape disposed on the raw material roll and a cutting unit for cutting the fiber tape;
  applying the fiber tape to an application surface of an application device and fixing the fiber tape on the application surface, the application surface of the application device being divided into at least two sub-regions when seen over the width of the application device, and each of the sub-regions is assigned to a roll-out device, and the at least two sub-regions of the application surface and the respective related roll-out device of the laying device can be moved relative to one another independently of the other roll-out device and the other sub-region in the longitudinal extension of the application surface;
  unreeling the fiber tape by relatively moving each sub-region of the application surface of the application device and the related roll-out device of the laying device, the fiber tape being fixed to the application surface, as a result of which the fiber tape is unreeled in strips onto the application surface due to the application surface pulling on the fiber tape;
  cutting the fiber tape to length by means of the cutting unit of the roll-out device.

The advantage of the method proposed by the invention is that due to the individual method steps which may be run in parallel with one another, the total production time involved in producing a laid structure can be reduced.

In particular, it may be of advantage if, after picking up the fiber tape cut to length, the following method steps are implemented:
  picking up the fiber tape cut to length by means of a manipulation device for manipulating the fiber tape applied to the application device;
  transferring the fiber tape from the application device to a stacking device;
  applying the fiber tape to an application surface of the stacking device;

feeding in the next fiber tape layer and stacking the fiber tape layers one on top of the other.

The advantage of this is that the individual layers of fiber tapes can be stacked one on top of the other and joined to produce a laid structure.

Based on another advantageous embodiment, the application surface on the stacking device for receiving the fiber tape may be of an air-permeable design to which a negative pressure can be applied so that the fiber tape applied to the application surface is fixed thereon. The advantage of this is that the fiber tape can be fixed on the application surface in the easiest possible way.

Furthermore, the fiber tape may be received by a receiving surface of the manipulation device due to the fact that it is of an air-permeable design to which a negative pressure can be applied and in order to transfer the fiber tape from the application device to the manipulation device, a negative pressure applied to the application device is switched off. The advantage of this is that the fiber tape can be easily picked up by the manipulation device.

In particular, it may be of advantage to provide several of the roll-out devices adjacent to one another, and the roll-out devices are connected to the laying device in a stationary arrangement, and the application surfaces of the application device are provided on several mutually parallel profiles, and a pattern of fiber tapes is formed by moving the individual profiles independently of one another in a longitudinal extension of the application surface and thus pulling the respective fiber tapes off the raw material rolls. The advantage of this is that individual fiber tapes can be laid in any shape in individual fiber tape layers.

It may also be of practical advantage if, in order to cut the fiber tape, the cutting unit of the roll-out device is operated in a forward-fed cutting position and the fiber tape is clamped by means of the clamping unit and after cutting the fiber tape, the cutting unit and/or the clamping unit is/are moved relative to one another together so that a cut end of the tape is moved so that it extends out from the cutting unit. The advantage of this is that after the fiber tape has been cut, it is prepared in readiness for unreeling the next length.

Furthermore, in order to apply the fiber tape to the application surface of the application device, the fiber tape is clamped by means of the clamping unit and then the clamping unit and/or the cutting unit is/are moved relatively towards one another, as a result of which the fiber tape is pushed forwards beyond the cutting unit so that a free end of the fiber tape is formed, and the fiber tape is then fixed to the application surface of the application device so that the fiber tape is received on the application surface of the application device so as to be non-movable relative thereto and unreeling from the raw material roll can then continue by moving the application surface of the application device relative to the roll-out device of the laying device. As a result of this feature, it is possible to position the fiber tape on the application surface with a higher degree of accuracy.

Furthermore, in order to fix the free end of the fiber tape on the application surface of the application device, a vacuum is applied to the application surface and/or a downholder roll is pressed onto the fiber tape. As a result, the fiber tape securely adheres to the application surface to enable unreeling from the raw material roll by means of the application surface. In particular, the downholder roll may be driven and the fiber tape is clamped between the application surface and the downholder roll. If the downholder roll is driven, the application profile can also be moved due to friction by means of the downholder roll. The downholder roll can therefore be used simultaneously as a drive system for moving the application profile.

A release liner may be provided on the fiber tape disposed on the raw material roll which lies between the individual fiber tape layers, and as the fiber tape is unreeled, the release liner is wound onto a release liner roll. In particular in this context, the release liner roll may be driven and the release liner therefore actively used as a means of actively pulling the fiber tape off the raw material roll.

To provide a clearer understanding, the invention will be described in more detail below with reference to the appended drawings.

Figure 2:
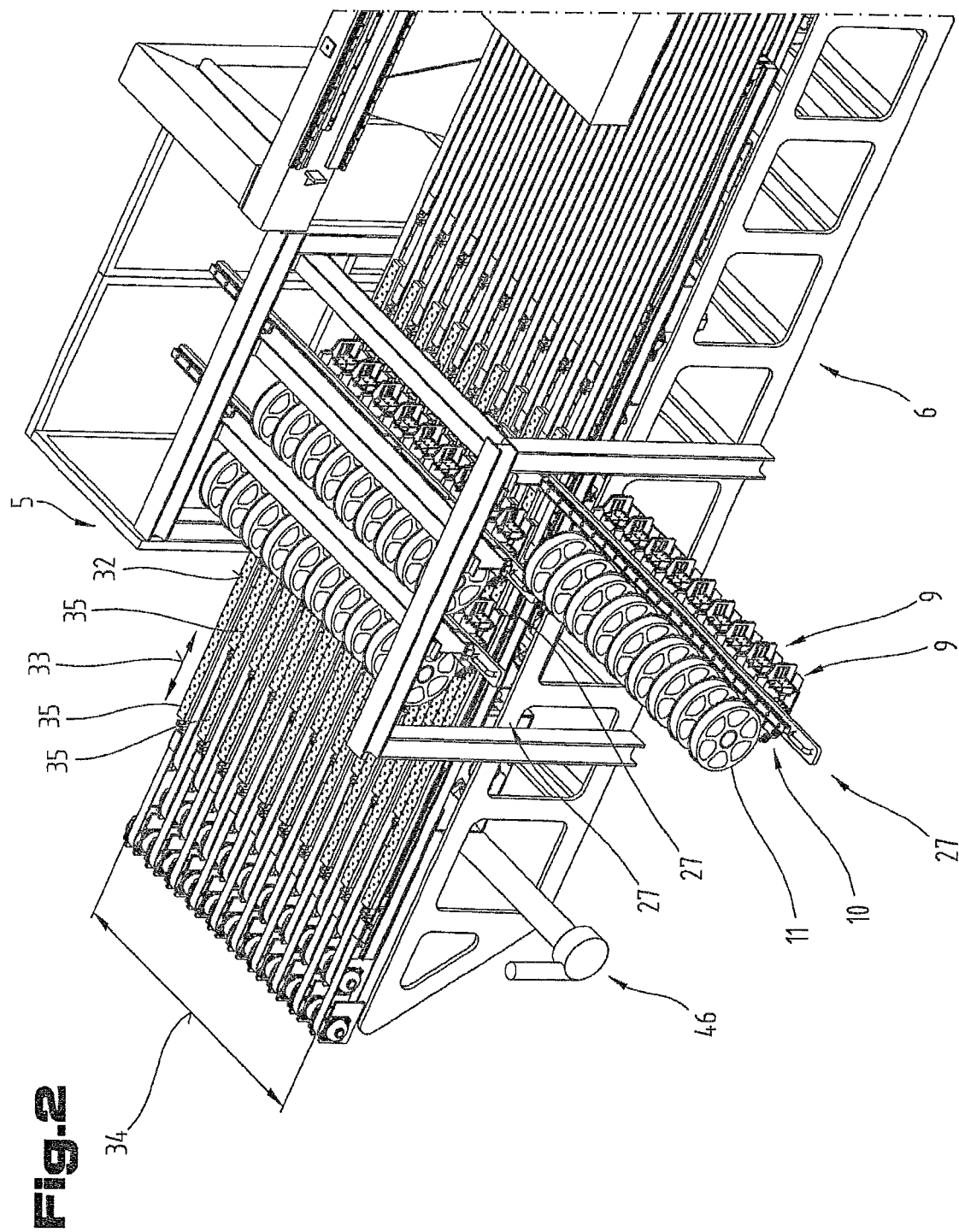
Figure 6:
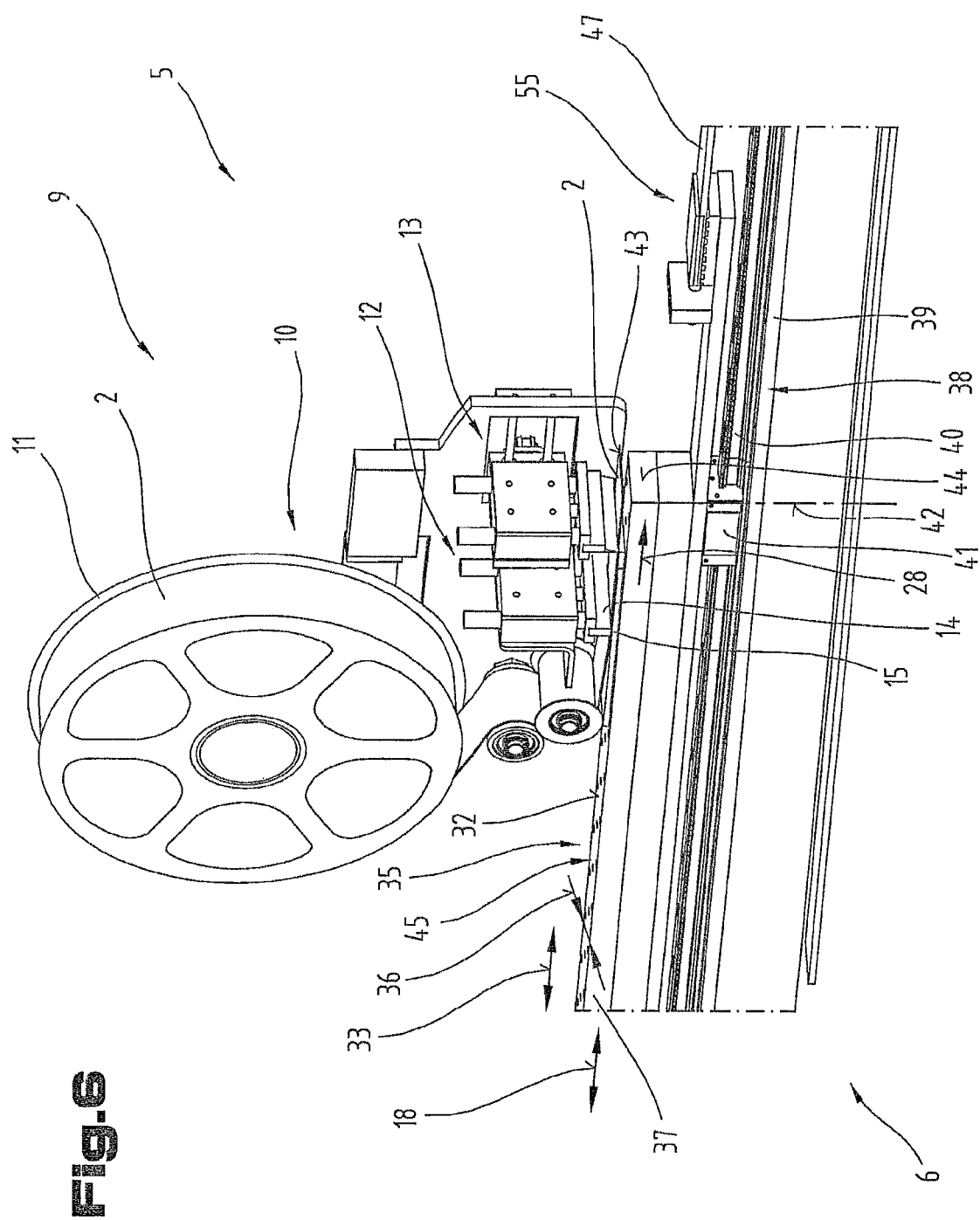
Figure 13:
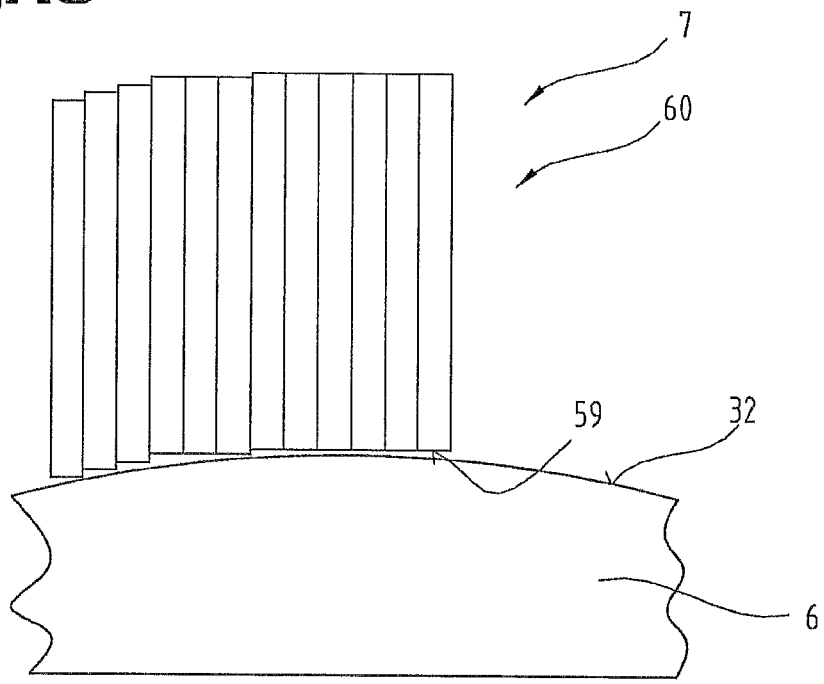
Figure 14:
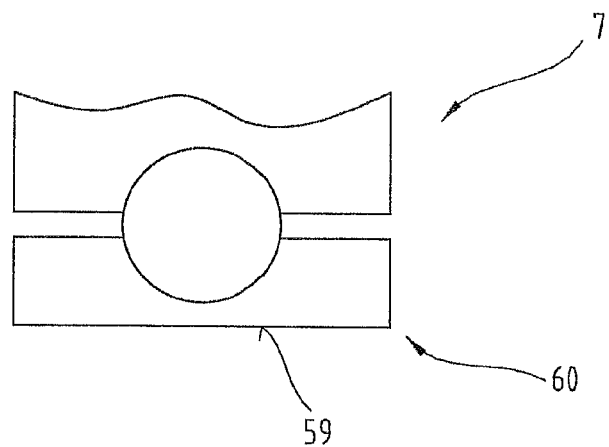
Figure 15:
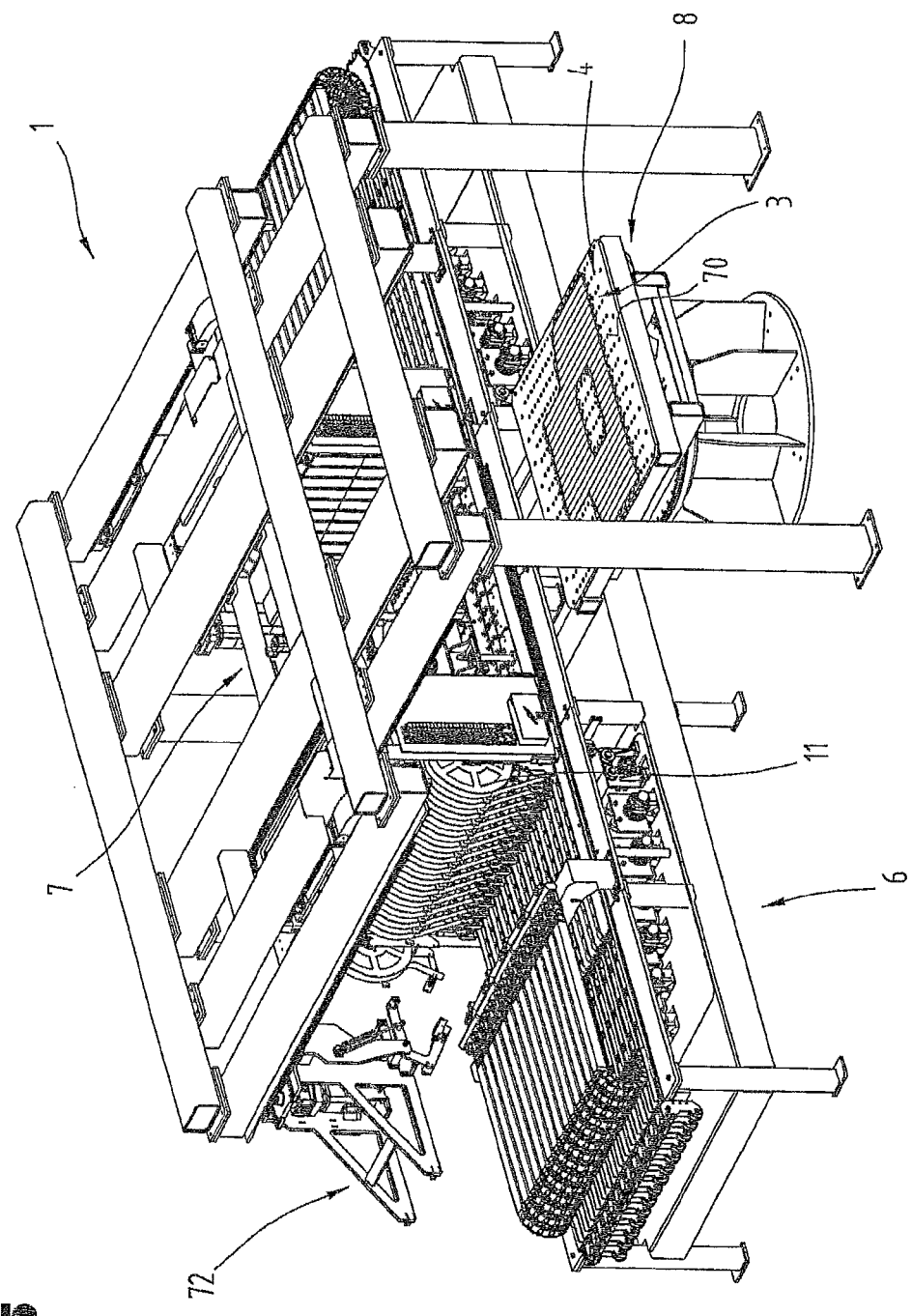
Figure 16:
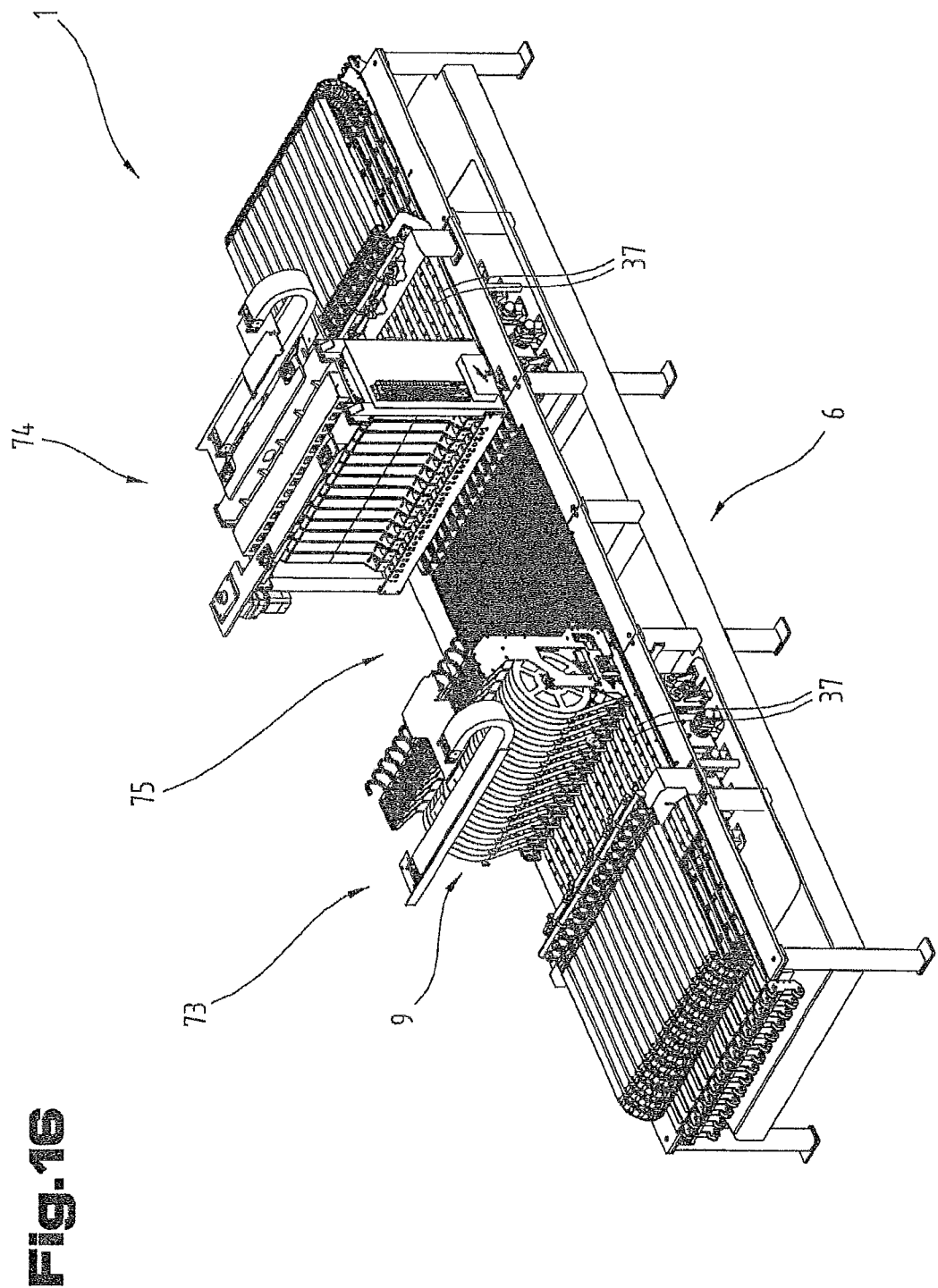

These are highly simplified, schematic diagrams illustrating the following:

FIG. 1 a perspective view of an embodiment of a production system for laying fiber tapes;

FIG. 2 a perspective detailed view of an embodiment of an application device of the production system;

FIG. 3 a perspective view of an embodiment of a roll-out device;

FIG. 4 a view of a roll-out device from the front;

FIG. 5 a plan view of a schematic layout of the arrangement of roll-out devices;

FIG. 6 a perspective view of a roll-out device having a receiving device in the form of an application profile;

FIG. 7 a schematic diagram showing a view from the front of two adjacently disposed application profiles with fiber tapes laid thereon;

FIG. 8 a side view of a roll-out device with an application profile;

FIG. 9 an example of another embodiment of an application profile having toothing;

FIG. 10 an example of another embodiment of a receiving device;

FIG. 11 a plan view of an example of another embodiment of a receiving device;

FIG. 12 a plan view of an example of another embodiment of the production system;

FIG. 13 a schematic side view of an example of an embodiment of a manipulation device having a segmented receiving head;

FIG. 14 a schematic detailed view of an example of an embodiment of the segmented receiving head;

FIG. 15 a perspective diagram of an example of another embodiment of the production system;

FIG. 16 a perspective diagram of an example of another embodiment of the production system with some system components blanked out;

FIG. 17 a perspective diagram of an example of another embodiment of the roll-out device;

FIG. 18 a schematic side view of a design of an example of another embodiment of a roll-out device having a release liner and release liner roll.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 1 is a perspective view illustrating a production system 1 for laying fiber tapes 2. By means of the production system 1, the fiber tapes 2 can be laid in a fiber tape layer 3. The fiber tape layer 3 may be provided with a contoured outer edging in the production system 1 adapted to the respective application by using individual fiber tapes 2. In the production system 1, several of the fiber tape layers 3 may be laid one on top of the other and thus further processed to obtain a laid structure 4.

The fiber tapes 2 processed in the production system 1 may be in the form of dry fibers, for example. It is also possible for the fiber tapes 2 to be pre-impregnated fibers incorporating reaction resins consisting of a usually highly viscous but as yet non-polymerized duroplast synthetic matrix and/or a thermosetting plastic matrix or some other matrix. The fiber tapes 2 may also be provided with adhesive layers by means of which individual fiber tape layers 3 are able to adhere to one another.

The production system 1 comprises a laying device 5 for laying the fiber tape 2, an application device 6 for receiving the laid fiber tapes 2 and a manipulation device 7 by means of which the fiber tapes 2 or fiber tape layers 3 laid on the application device 6 can be manipulated.

The production system 1 may also comprise a stacking device 8 on which the individual fiber tape layers 3 can be stacked by means of the manipulation device 7 to form a laid structure 4. The described main components of the production system 1, in particular the laying device 5, application device 6, manipulation device 7 and stacking device 8, may respectively be provided as a functional unit and be integrated in the production system 1 in a modular arrangement.

In the following description, different design options of the individual main components of the production system 1 and the possible arrangements treated as modules will be described, FIG. 1 being used as a reference for parts of the modules.

FIG. 2 is a perspective detailed view illustrating one possible embodiment of the laying device 5 and the application device 6, the same reference numbers and component names being used for parts that are the same as those in FIG. 1 above. To avoid unnecessary repetition, reference may be made to the more detailed description of FIG. 1.

The laying device 5 comprises at least two roll-out devices 9 which are disposed adjacent to one another and which respectively have a receiving device 10 for receiving a raw material roll 11.

In FIG. 3, the roll-out device 9 is illustrated in a perspective view. In FIG. 4, the roll-out device 9 is illustrated in a view from the side. The same reference numbers and component names are again used for parts that are the same as those in FIGS. 1 to 3. To avoid unnecessary repetition, reference may be made to the more detailed description of FIGS. 1 to 3. The roll-out device 9 will be described with reference to FIGS. 2 to 4 jointly.

The roll-out device 9 comprises a clamping unit 12 for fixing the fiber tape 2 to be unreeled from the raw material roll 11 and a cutting unit 13 for cutting the fiber tape 2. As may be seen from FIG. 3, the clamping unit 12 has a clamp 14 and the fiber tape 2 is clamped between the clamp 14 and a counter-holder 15. In this connection, the clamp 14 may be mounted on an actuator, such as a pneumatic cylinder, so that it can be moved.

Furthermore, the cutting unit 13 may be provided in the form of a guillotine and the cutting unit 13 may comprise a cutting blade 16 and a counter-holder 17. The counter-holder 17 of the cutting blade 16 may be disposed directly next to the counter-holder 15 of the clamp 14 adjoining the latter.

The cutting blade 16 may also be mounted on an actuator, such as a pneumatic cylinder, enabling the cutting blade 16 to be moved relative to the counter-holder 17 and thus effect the cutting movement.

It is also possible for the cutting unit 13 to be mounted on the roll-out device 9 so as to be displaceable in the horizontal direction 18 relative to the clamping unit 12. As a result, the cutting unit 13 can be moved backwards and forwards between a forward-feed cutting position 19 and a retracted unreeling position 20. This is necessary in particular in order to make a tape attachment 21 available after cutting the fiber tape 2 to which the fiber tape 2 can be fixed to enable another strip to be unreeled.

As may be seen particularly clearly from FIG. 4, when the cutting unit 13 is positioned in its unreeling position 20, the counter-holder 17 of the cutting blade 16 and the counter-holder 15 of the clamp 14 lie adjoining one another.

Furthermore, the fiber tape 2 unreeled from the raw material roll 11 by the roll-out device 9 may be guided by means of a deflection roller assembly 22 having at least one deflection roller 23. Following the path of the fiber tape 2, the clamping unit 12 is disposed next to the deflection roller assembly 22 and further along the path of the fiber tape 2 is the cutting unit 13.

The fiber tape 2 has a width 24 which may be between 2 mm and 200 mm, in particular between 5 mm and 100 mm, preferably between 10 mm and 50 mm. The fiber tape 2 also has a tape thickness 25 which may be between 0.03 mm and 10 mm, in particular between 0.5 mm and 5 mm, preferably between 0.8 mm and 3 mm.

As may be seen from FIG. 4, an optical unit 26 may be provided, which is used to detect the tape. The optical unit 26 may preferably be disposed on the roll-out device 9 adjacent to the cutting unit 13 so that the length of an unreeled fiber strip can be determined by means of the optical unit 26 as the fiber tape 2 is unreeled. The optical unit 26 may also be configured so that the quality and/or dimensions of the fiber tape 2 can be checked. Furthermore, the optical unit 26 may be used to identify the fiber tape 2.

Alternatively or in addition, a detection or measuring system may be integrated in the deflection roller 23 or in the receiving device 10 for the raw material roll 11 by means of which the length of unreeled tape can be detected.

A braking unit may also be integrated in the receiving device 10 for the raw material roll 11 so that the raw material roll 11 can be braked and thus prevent undesired unreeling of the fiber tape 2.

Based on an alternative embodiment, the receiving device 10 for the raw material roll 11 may comprise a drive unit by means of which the raw material roll 11 may be driven and/or braked as and when necessary. This prevents increased tensile stress on the fiber tape 2 at higher operating speeds, thereby enabling the operating speeds to be further increased.

Based on an alternative embodiment, the clamping unit 12 may be displaceable in the horizontal direction 18. This ability to move may be an alternative or in addition to the ability of the cutting unit 13 to move.

As may be seen particularly clearly from FIG. 2, several roll-out devices 9 of the laying device 5 may be provided and the roll-out devices 9 may be mounted on the laying device 5 in rows 27. For example, the laying device 5 may have three rows 27 and between 5 and 15 roll-out devices 9 may be provided in each row 27, for example. The individual fiber tapes 2 may be unreeled from the roll-out devices 9 in an unreeling direction 28.

The laying device 5 may also comprise a guide rail 29 on which the roll-out devices 9 are disposed in rows. By means of the guide rail 29, the roll-out devices 9 can be pulled sideways out of the laying device 5. In particular, the guide rail 29 may be configured so that the roll-out devices 9 can be pulled out of the working area of the laying device 5, thereby making it easier to set up the production system 1 with new raw material rolls 11.

FIG. 5 is a schematic diagram showing a plan view of the laying device 5. As may be seen from FIG. 5, the roll-out devices 9 may have a module width 30 which corresponds to the width 24 of the fiber tape 2. Individual roll-out devices 9 disposed in the rows 27 may be disposed at a distance from one another corresponding to the module width 30 or a multiple thereof. If the roll-out devices 9 are disposed in three rows 27, it may be, for example, that there is a distance of twice the module width 30 respectively between two adjacently lying roll-out devices 9 in a row 27. As a result of these features, the unreeled fiber tapes 2 can be laid closely together on the application device 6.

In this context, the module width 30 of the roll-out device 9 is a virtual measurement. In particular, it would be conceivable for an actual width 31 of the roll-out device 9 to be greater than the module width 30. The fact that the roll-out devices 9 are disposed in rows prevents the adjacently disposed roll-out devices 9 from colliding with one another.

If the actual width 31 of the roll-out device 9 is the same size as the module width 30 of the roll-out device 9, a situation would also be conceivable in which only one row 27 of roll-out devices 9 has to be provided, in which case the roll-out devices 9 lie closely adjoining one another in such an embodiment. Based on such an arrangement, all the raw material rolls 11 would have to be mounted on a common bearing point.

As may be seen from FIG. 2, the application device 6 has an application surface 32 on which the fiber tape 2 unreeled from the roll-out device 9 can be laid and positioned.

FIG. 6 is a perspective detailed view illustrating a roll-out device 9 with the application device 6 disposed underneath.

As may be seen from FIG. 2 and FIG. 6 together, the fiber tape 2 is rolled out lengthways in a longitudinal extension 33 of the application surface 32. Furthermore, the application surface 32 is divided into several sub-regions 35 across the width 34 of the application device 6. The sub-regions 35 may be used respectively for receiving a fiber tape 2.

Furthermore, a roll-out device 9 for unreeling the fiber tape 2 may be provided for each sub-region 35. Accordingly, an individual fiber strip of a fiber tape 2 can be laid on every sub-region 35.

Furthermore, a width 36 of the sub-region 35 is approximately the same size as the width 24 of the fiber tape 2.

Based on an alternative variant, the width 36 of the sub-region 35 may also be slightly smaller than the width 24 of the fiber tape. This is schematically illustrated in FIG. 7. Based on such an embodiment, the fiber tape 2 extends beyond the sides of the application surface 32 of the sub-region 35. As a result, two adjacently disposed fiber tapes 2 touch one another.

Furthermore, as may be seen from FIG. 6, the application surface 32 may be provided on an application profile 37 which is used for receiving the fiber tapes 2. The application profile 37 may be coupled with a base frame 39 of the application device 6 by means of a linear guide 38. In particular, the linear guide 38 may comprise a guide track 40 which is disposed on the base frame 39 and comprises a guide carriage 41 which is coupled with the application profile 37 and which is received in the guide track 40 so as to be displaceable.

Due to the linear guide 38, the application profile 37 can be moved in the horizontal direction 38, as a result of which the roll-out device 9 and the application profile 37 can be moved relative to one another.

By moving the application profile 37 in the horizontal direction 38 respectively in the unreeling direction 28, the fiber tape 2 can be unreeled from the raw material roll 11 and laid in the longitudinal extension 33 on the application surface 32 of the application profile 37. The fiber tape 2 can then be cut to the desired length by means of the cutting unit 13. Having been cut to length and positioned, the fiber tape 2 can then be picked up from the application surface 32 by means of the manipulation device 7 and the cutting unit 13 moved into its unreeling position 20 and the application profile 37 moved into a normal position 42.

The normal position 42 is preferably selected so that a cut surface 43 of the fiber tape 2 and an end face 44 of the application profile 37 lie flush with one another. A vacuum can then be applied to the application surface 32 so that the tape attachment 21, which projects out from the cutting unit 13, is firmly sucked onto the application surface 32 and the fiber tape 2 can be pulled off the raw material roll 11 by means of the application profile 37. Naturally, the fiber tape 2 may also be clamped or fixed on the application surface 32 by any other feature.

To enable negative pressure to be applied to the application surface 32, several orifices 45 may be provided in the application surface 32 through which air is sucked. In particular, the orifices 45 may have a flow connection to a device for generating negative pressure 46. Such a device for generating negative pressure 46 may be provided in the form of an axial or radial blower.

FIG. 8 illustrates an example of an embodiment of the roll-out device 9 with the application device 6 in a side view, the same reference numbers and component names being used to denote parts that are the same as those described in connection with FIGS. 1 to 7 above. To avoid unnecessary repetition, reference may be made to the more detailed description of FIGS. 1 to 7 above.

As may be seen from FIGS. 2, 6 and 8 together, the application profile 37 may be coupled with a toothed belt 47 by means of which the application profile 37 can be moved in the horizontal direction 18. In particular, a first end section 48 of the toothed belt 47 may be coupled with a first end section 49 of the application profile 37. Similarly, a second end section 50 of the toothed belt 47 may be coupled with a second end section 51 of the application profile 37.

Accordingly, the application profile 37 and the toothed belt 47 form a continuous loop. Furthermore, the toothed belt 47 may be coupled with a drive unit 52 by means of which the application profile 37 can be moved in the horizontal direction 18. The toothed belt 47 may be deflected on a first deflection unit 53 and on a second deflection unit 54.

The toothed belt 47 may be attached to the application profile 37 by means of fastening jaws 55. In this connection, it would be conceivable to provide a clamping unit on the fastening jaws 55 by means of which the toothed belt 47 can be clamped. Alternatively, the toothed belt 47 may be clamped by moving the drive unit 52.

The application profile 37 may also be divided into several longitudinal sub-regions 56 and negative pressure can be applied to the longitudinal sub-regions 56 selectively. As a result, when fixing the fiber tape 2 on the application surface 32 of the application device 6, excessive leakage of air or negative pressure is avoided.

As illustrated in FIG. 2, several such units of this type may be provided adjacent to one another.

FIG. 9 is a schematic diagram illustrating another embodiment of the design of the application profile 37. As may be seen from FIG. 9, the application profile 37 may be partially provided as a toothed rack 57 or may have toothing. Alternatively, a toothed rack 57 may be provided, which is disposed on the linear guide 38 and engages with a pinion 58. The toothed rack 57 may be provided on the bottom face of the application profile 37, for example. Alternatively, it would also be conceivable for the toothed rack 57 to be provided on the side of the application profile 37. An embodiment using a toothed rack 57 has an advantage in that the accuracy with which the application profile 37 is positioned can be increased using such a system.

FIG. 10 illustrates an example of another embodiment of the application device 6 together with the roll-out device 9. As may be seen from FIG. 10, the application surface 32 of the application device 6 may be disposed on a circulating belt of a belt conveyor. This circulating belt may have an air-permeable surface so that the application surface 32 may be placed under vacuum. The way such a conveyor belt operates is similar to the way the application profile 37 described above operates. In particular, the fiber tape 2 is unreeled by moving the application surface 32 relative to the roll-out device 9.

FIG. 11 is a plan view illustrating another embodiment of the co-operation between the roll-out device 9 and application device 6. As may be seen from FIG. 11, a relative movement between the roll-out device 9 and application device 6 is achieved due to the fact that the individual adjacently disposed roll-out devices 9 can be moved independently of one another in the horizontal direction 18. The application surface 32 of the application device 6 may be stationary in this instance.

Based on another alternative variant, it is conceivable for both the roll-out device 9 and the application surface 32 of the application device 6 to be moved in the horizontal direction 18.

As may be seen from FIG. 1, the manipulation device 7 has a receiving surface 59 by means of which the fiber tapes 2 laid on the application device 6 and cut to length can be received and transferred to the stacking device 8. Like the application surface 32, the receiving surface 59 may be of an air-permeable design to enable the fiber tapes 2 to be fixed on the receiving surface 59. It is also conceivable for the receiving surface 59 to be divided into sub-regions, in which case a negative pressure can be applied to the sub-regions selectively, thereby preventing excessive energy loss.

The receiving surface 59 may be disposed on a receiving head 60. It is also conceivable for the receiving head 60 with the receiving surface 59 to be mounted so as to be rotatable about a vertical axis 61. As a result, the individual fiber tape layers 3 can be laid on the stacking device 8 at different angles to one another.

Furthermore, at least one heating element 62 may be disposed on the receiving head 60 by means of which the individual fiber tape layers 3 can be at least partially melted and thus joined to one another. The heating element 62 may be provided in the form of resistance heating wires, for example. Based on an alternative variant, the heating element 62 may be provided in the form of an ultrasound unit or laser unit to enable the energy needed to melt the individual fiber tape layers 3 to be introduced into the laid structures 4.

Furthermore, the manipulation device 7 may have a feeding unit 63 by means of which an additive such as a resin can be fed to the individual fiber tape layers 3.

Furthermore, a provisioning station 64 may be provided in the production system 1 from which additives can be picked up by means of the manipulation device 7 and introduced into the stacking device 8.

Based on one embodiment, as illustrated in FIG. 1, the manipulation device 7 may have a linear guide 65 by means of which the receiving head 60 can be moved in the horizontal direction of movement 18. The manipulation device 7 may also have a lifting unit 66 by means of which the receiving head 60 can be moved in a vertical direction of movement 67.

Based on another embodiment illustrated in FIG. 12, the receiving head 60 may be moved in another horizontal direction of movement 68 oriented at a right angle to the horizontal direction of movement 18. For example, this may be achieved due to the fact that the entire linear guide 65 of the manipulation device 7 on which the receiving head 60 is mounted can be moved in the other horizontal direction of movement 68. This enables the flexibility of the manipulation device 7 to be increased because it can be moved in three axes.

As may be seen from FIG. 1, the stacking device 8 may be provided in the form of a belt conveyor 69 and an application surface 70 is provided on the surface of a conveyor belt 71. The conveyor belt 71 may be of an air-permeable design to enable a fiber tape layer 3 laid on the application surface 70 to be fixed.

The method for building the laid structures 4 may comprise the following method steps. As described above, the individual fiber tapes 2 may be unreeled from the roll-out device 9 and received on the application device 6. By individually moving the individual sub-regions 35 of the application device 6, the length and/or position of adjacently laid fiber tapes 2 can be determined so that a fiber tape layer 3 with a freely selectable and pre-definable external contour can be formed. This fiber tape layer 3 can then be picked up by the manipulation device 7 to enable it to be transported onwards to the stacking device 8. At the stacking device 8, individual fiber tape layers 3 can be stacked to produce a laid structure 4. In this respect, it is possible for different fiber tape layers 3 to be laid on top of one another in different orientations.

As an alternative to an embodiment in which negative pressure can be applied to the individual components for receiving the fiber tapes 2, it is also conceivable for some or only individual components to be electrostatically charged to enable the fiber tape 2 to be adhered to or fixed on the respective component and/or on the respective application surface 32, 70 or receiving surface 59.

As may be seen from FIG. 13, the application surface 32 of the application device 6 may be curved in at least certain regions. Not only does this enable fiber tape layers 3 and hence laid structures 4 that are flat to be produced but also laid structures 4 with a contoured surface.

Based on one embodiment, it may be that the contour of the application surface 32 is fixedly predefined and not variable, for example.

Based on another embodiment, it may also be that the contour of the application surface 32 can be variably adapted. For example, this can be achieved due to the fact that the application surface 32 of the application device 6 is segmented and the individual segments can be moved independently of one another.

Furthermore, for example, the application surface 32 of the application device 6 may be provided on a conveyor belt, in which case the application surface 32 is flat in the application region and the surface of the conveyor belt in another region is provided with the contouring. By moving the conveyor belt into the other region, therefore, the fiber tape layer 3 can be brought to its desired shape. In particular, this means that the individual fiber tapes 2 can be draped.

Furthermore, a receiving surface 59 of the manipulation device 7 may likewise be contoured to enable a contoured fiber tape layer 3 to be received.

In particular in this context, it may be that the receiving head 60 of the manipulation device 7 is divided into segments. This enables the receiving head 60 to be variably adjusted or adapted to the shape of the fiber tape layer 3.

Based on another embodiment, although this is not illustrated, the individual segments of the receiving head 60 may be covered by a common overlay which forms the receiving surface 59. This enables the receiving surface 59 to be smoothed.

Based on another embodiment illustrated in FIG. 14, the individual segments of the receiving head 60 may have a flexible mount on which the receiving surface 59 is disposed. This enables the individual segments to be adapted to the surface contour of the fiber tape layer 3.

FIGS. 15 to 17 illustrate another embodiment of the production system 1 which may be construed as an independent embodiment in its own right, the same reference numbers and component names being used to denote parts that are the same as those described in connection with FIGS. 1 to 14 above. To avoid unnecessary repetition, reference may be made to the more detailed description of FIGS. 1 to 14 above.

FIG. 15 is a perspective view of another embodiment of the production system 1. As may be seen from FIG. 15, the manipulation device 7 for transferring a fiber tape layer 3 to the stacking device 8 is disposed on a gantry. In this case, the stacking device 8 may be disposed next to the application device 6. The stacking device 8 may have a rotary table so that its application surface 70 can be rotated relative to the manipulation device 7. This means that the manipulation device 7 does not have to be of a rotatable design in order to stack individual fiber tape layers 3 one on top of the other.

The production system 1 may also have a roll changing device 72 which is used for changing the raw material rolls 11.

FIG. 16 is another schematic diagram of the production system 1 but to provide a better overall view, the manipulation device 7 and its mounting system are not shown.

As may be seen from FIG. 16, the application device 6 has a first machine side 73 and a second machine side 74 each having several application profiles 37 and hence co-operating roll-out devices 9. The application profiles 37 of the first machine side 73 and the application profiles 37 of the second machine side 74 are disposed relative to one another in such a way that they can be pushed into one another in a meshing arrangement. In other words, therefore, an application profile 37 of the second machine side 74 can be pushed in between two application profiles 37 of the first machine side 73. On each machine side 73, 74, therefore, the application profiles 37 are respectively disposed at a distance from one another that is at least as big as the width 36 of the application profiles 37.

When the production system 1 is in a position as illustrated in FIG. 16 and the individual application profiles 37 are respectively positioned underneath the roll-out devices 9, the fiber tape 3 can be positioned on the application profiles 37. The individual application profiles 37 can then be pushed into the machine center 75 where they engage with one another in a meshing arrangement to form the finished fiber tape layer 3 there, which can be removed by means of the manipulation device 7. Every second fiber tape 2 of the fiber tape layer 3 is therefore laid on the first machine side 73 and the fiber tapes 2 of the fiber tape layer 3 lying in between are laid on the second machine side 74.

The individual application profiles 37 are disposed on the application device 6 so that they can be moved by means of linear guides. Furthermore, individual actuator drives may be provided, which are used to position the application profiles 37.

FIG. 17 illustrates an example of another embodiment of the roll-out device 9. Such a design of the roll-out device 9 can be combined with different designs of production systems 1, such as those described with reference to FIGS. 1 and 2, respectively FIGS. 15 and 16.

As may be seen from FIG. 17, the clamping unit 12 of the roll-out device 9 is disposed on a linear guide 76 and is therefore disposed so that it can be moved on the roll-out device 9 in a horizontal direction 18 relative to the cutting unit 13. An actuator 77 may also be provided, which is used for horizontally moving the clamping unit 12. The actuator 77 may be provided in the form of a pneumatic cylinder. By means of the clamping unit 12, the fiber tape 2 can be pushed out beyond the cutting unit 13 so as to form a free end 78 which can be fixed on the application surface 32.

A downholder roll 79 may also be provided, by means of which the free end 78 of the fiber tape 2 can be pressed onto the application surface 32 of the application device 6. It may also be that the downholder roll 79 can be actively pressed onto the application surface 32 and lifted back off it by means of an actuator 80.

A roll changing clamp 81 may also be provided, by means of which the fiber tape 2 can be clamped when the raw material roll 11 is being automatically changed.

With reference to FIGS. 15-17, the possible sequence for forming a laid structure 4 made up of individual fiber tapes 2 will now be described. At the start of this method, the fiber tape 2 is clamped in the clamping unit 12 and cut to length beforehand by the cutting unit 13. The fiber tape 2 is therefore flush with the cutting blade 16 of the cutting unit 13. The application profile 37 is located in a receiving position ready to receive and the downholder roll 79 is lifted off the application surface 32.

In a first method step, the clamping unit 12 is moved in the horizontal direction 18 towards the cutting unit 13, as a result of which the fiber tape 2 is pulled off the raw material roll 11 and moved out beyond the cutting unit 13 so that a free end 78 of the fiber tape 2 is formed. The free end 78 of the fiber tape 2 is thus moved in underneath the downholder roll 79. In other words, the free end 78 of the fiber tape 2 is positioned between the downholder roll 79 and the application surface 32.

In a subsequent method step, the downholder roll 79 is moved in the direction of the application surface 32 so that the free end 78 of the fiber tape 2 is clamped between the downholder roll 79 and the application surface 32. In addition, a negative pressure is simultaneously applied to the application surface 32 so that the free end 78 of the fiber tape 2 is sucked onto the application surface 32 and fixed thereon.

In another method step, the clamp of the clamping unit 12 is released and the fiber tape 2 can be pulled off the raw material roll 11 by means of the application surface 32 respectively the application profile 37.

In order to pull the fiber tape 2 off the raw material roll 11, the application surface 32 and the roll-out device 9 are moved relative to one another and because the fiber tape 2 is clamped on the application surface 32, the fiber tape 2 is pulled off the raw material roll 11 due to the movement. In this context, it may be that the raw material roll 11 is braked so that the fiber tape 2 located on the raw material roll 11 does not slacken.

To effect the movement of the application surface 32 relative to the roll-out device 9, it is possible for the application surface 32 to remain stationary and the roll-out device 9 to be moved, for example. It is also conceivable, as is the case in this example of an embodiment, for the roll-out device 9 to remain stationary and for the application surface 32 to be disposed on the application profile 37 which is moved relative to the roll-out device 9.

As may be seen particularly clearly from FIG. 16, in order to lay the fiber tapes 2 on the individual application profiles 37, the latter are moved in the direction towards the machine center 75. As this happens, the individual application profiles 37 are moved far enough in the direction of the machine center 75 until a sufficient length of the fiber tape 2 has been pulled off the raw material roll 11 and positioned on the application surface 32.

The fiber tape 2 is then clamped by means of the clamping unit 12 again and cut by means of the cutting unit 13.

In a subsequent method step, the individual application profiles 37 are moved far enough in the direction of the machine center 75 until an application profile 37 of the first machine side 73 and an application profile 37 of the second machine side 74 are disposed alternately in the machine center 75. The fiber tape layer 3 is formed by the sum of fiber tapes 2 disposed on the individual application profiles 37.

As may be seen from FIG. 15, the fiber tape layer 3 can then be removed from the machine center 75 by means of the manipulation device 7 and transported to the stacking device 8 where the individual fiber tape layers 3 are laid one on top of the other to form a laid structure 4. During this method step, the individual application profiles 37 can be moved back into their receiving position.

To enable differently oriented fiber tape layers 3 to be built up on the stacking device 8, the application surface 70 of the stacking device 8 can be turned about a vertical axis after receiving a fiber tape layer 3 to enable a new fiber tape layer 3 to be received.

FIG. 18 illustrates another embodiment of the production system 1 which may optionally be construed as an independent embodiment in its own right, the same reference numbers and component names being used to denote parts that are the same as those described in connection with FIGS. 1 to 17 above. To avoid unnecessary repetition, reference may be made to the more detailed description of FIGS. 1 to 17 above.

As may be seen from FIG. 18, a release liner 82 is provided on the fiber tape 2 and is thus wound together with the fiber tape 2 on the raw material roll 11. In the wound state, the release liner 82 lies between the individual layers of the fiber tape 2 wound on the raw material roll 11. The production system 1 may also comprise a release liner roll 83 provided as a means of winding the release liner 82. In particular, the release liner roll 83 may be driven by means of a rotary drive and the release liner 82 together with the fiber tape 2 adhered thereto can therefore be actively pulled off the raw material roll 11. In particular, this means that forward feeding of the fiber tape 2 as the application surface 32 is being moved can be assisted by the release liner roll 83 or taken over completely by the release liner roll 83.

The embodiments illustrated as examples represent possible variants and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

The protective scope is defined by the claims. However, the description and drawings may be used to assist with interpreting the claims. Individual features or combinations of features from the different embodiments illustrated and described may be construed as independent inventive solutions or solutions proposed by the invention in their own right. The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

For the sake of good order, finally, it should be pointed out that, in order to provide a clearer understanding of the structure, elements are illustrated to a certain extent out of scale and/or on an enlarged scale and/or on a reduced scale.

LIST OF REFERENCE NUMBERS

1 Production system
2 Fiber tape
3 Fiber tape layer
4 Laid structure
5 Laying device
6 Application device
7 Manipulation device
8 Stacking device
9 Roll-out device
10 Receiving device
11 Raw material roll
12 Clamping unit
13 Cutting unit
14 Clamp
15 Counter-holder
16 Cutting blade
17 Counter-holder
18 Horizontal direction
19 Cutting position pressure
20 Unreeling position
21 Tape attachment
22 Deflection roller assembly
23 Deflection roller
24 Width of fiber tape
25 Tape thickness
26 Optical unit
27 Row
28 Unreeling direction
29 Guide rail
30 Module width of roll-out device
31 Actual width of roll-out device
32 Application surface of application device
33 Longitudinal extension of application surface of the application device
34 Width of the application device
35 Sub-region of application surface 36 Width of sub-region
37 Application profile
38 Linear guide
39 Base frame
40 Guide track
41 Guide carriage
42 Normal position
43 Cut surface of fiber tape
44 End face of application profile
45 Orifice
46 Device for generating negative pressure
47 Toothed belt
48 First end section of toothed belt
49 First end section of application profile
50 Second end section of toothed belt
51 Second end section of application profile
52 Drive unit
53 First deflection unit
54 Second deflection unit
55 Fastening jaw
56 Longitudinal sub-region
57 Toothed rack
58 Pinion
59 Receiving surface
60 Receiving head
61 Vertical axis
62 Heating element
63 Feeding unit
64 Provisioning station
65 Linear guide manipulation device
66 Lifting unit
67 Vertical direction of movement
68 Other horizontal direction of movement
69 Belt conveyor
70 Application surface
71 Conveyor belt
72 Roll changing device
73 First machine side
74 Second machine side
75 Machine center
76 Linear guide of clamping unit
77 Actuator clamping unit
78 Free end
79 Downholder roll
80 Actuator of downholder roll
81 Roll changing clamp
82 Release liner
83 Release liner roll

The invention claimed is:

1. A production system for laying fiber tapes, the production system comprising:
a first raw material roll having a first fiber tape disposed on the first raw material roll and a second raw material roll having a second fiber tape disposed on the second raw material roll;
a laying device having at least first and second roll-out devices, wherein the first roll-out device comprises a first receiving device for receiving the first raw material roll, a first cutting unit for cutting the first fiber tape and a first clamping unit for fixing the first fiber tape disposed on the first raw material roll and wherein the second roll-out device comprises a second receiving device for receiving the second raw material roll, a second cutting unit for cutting the second fiber tape and a second clamping unit for fixing the second fiber tape disposed on the second raw material roll;
an application device having an application surface for receiving the first fiber tape unreeled from the first raw material roll and the second fiber tape unreeled from the second raw material roll, the application surface of the application device and each of the first and second roll-out devices being movable relative to one another in a longitudinal extension of the application surface so that the first fiber tape and the second fiber tape can be rolled out in strips onto the application surface, and
according to a width of the application device, the application surface of the application device is divided into at least first and second sub-regions, wherein the first sub-region is assigned to the first roll-out device and the second sub-region is assigned to the second roll-out device and the first sub-region of the application surface and the first roll-out device can be moved relative to one another in the longitudinal extension of the application surface independently of the second roll-out device and the second sub-region, wherein
the first cutting unit and/or the first clamping unit are mounted on the first roll-out device so that the first cutting unit and/or the first clamping unit can be moved by means of a first linear guide and the first cutting unit and the first clamping unit can thus be moved relative to one another and the second cutting unit and/or the second clamping unit are mounted on the second roll-out device so that the second cutting unit and/or the second clamping unit can be moved by means of a second linear guide and the second cutting unit and the second clamping unit can thus be moved relative to one another.

2. The production system according to claim 1, wherein a manipulation device is provided for manipulating the first fiber tape and the second fiber tape applied to the application device and the manipulation device has a receiving surface for receiving the first fiber tape and the second fiber tape, by means of which the first fiber tape and the second fiber tape applied to the application surface can be received by the manipulation device and transferred to another part of the production system.

3. The production system according to claim 2, wherein a stacking device is provided, having an application surface for receiving the first fiber tape and the second fiber tape on which the first fiber tape and the second fiber tape transferred by the manipulation device can be stacked, and the stacking device is physically disposed at a distance from the application device.

4. The production system according to claim 3, wherein the application surface of the stacking device is of an air-permeable design and can be subjected to a negative pressure so that the first fiber tape and the second fiber tape applied to the application surface of the stacking device can be fixed thereon.

5. The production system according to claim 2, wherein the stacking device comprises a belt conveyor and the application surface is provided on a continuously circulating conveyor belt of the belt conveyor.

6. The production system according to claim 3, wherein a provisioning station is provided, from which an additional layer waiting in readiness can be picked up by the manipulation device and transferred to the application device or to the stacking device.

7. The production system according to claim 2, wherein the receiving surface of the manipulation device is of an air-permeable design and can be subjected to a negative pressure so that the fiber tape can be fixed on the receiving surface.

8. The production system according to claim 2, wherein the receiving surface of the manipulation device is mounted so as to be rotatable about a vertical axis of the receiving surface.

9. The production system according to claim 2, wherein the manipulation device has a heating element which is integrated in or acts on the receiving surface.

10. The production system according to claim 2, wherein the manipulation device has an additive feeder configured to feed in an additive.

11. The production system according to claim 2, wherein the receiving surface of the manipulation device is curved in at least certain regions.

12. The production system according to claim 1, wherein the application surface of the application device is of an air-permeable design and can be subjected to a negative pressure so that the first fiber tape and the second fiber tape can be fixed on the application surface.

13. The production system according to claim 12, wherein the first and second sub-regions of the application surface of the application device are divided into longitudinal sub-regions as viewed in the longitudinal extension and a negative pressure can be selectively applied to the longitudinal sub-regions.

14. The production system according to claim 1, wherein the first clamping unit fixes the first fiber tape disposed on the first raw material roll and the first cutting unit of the first roll-out device can be moved relative to the first clamping unit of the first roll-out device, and the first cutting unit can be moved parallel with the application surface of the application device between an extracted cutting position and a retracted unreeling position and the second clamping unit fixes the second fiber tape disposed on the second raw material roll and the second cutting unit of the second roll-out device can be moved relative to the second clamping unit of the second roll-out device, and the second cutting unit can be moved parallel with the application surface of the application device between an extracted cutting position and a retracted unreeling position.

15. The production system according to claim 14, wherein the first cutting unit of the first roll-out device comprises a first guillotine comprising a first cutting blade and a first counter-holder and the second cutting unit of the second roll-out device comprises a second guillotine comprising a second cutting blade and a second counter-holder.

16. The production system according to claim 1, wherein the first clamping unit is movable by the first linear guide relative to the first cutting unit so that the first fiber tape clamped in the first clamping unit can be pushed out beyond the first cutting unit to form a free end of the first fiber tape which can be fixed on the application surface of the application device and the second clamping unit is movable by the second linear guide relative to the second cutting unit so that the second fiber tape clamped in the second clamping unit can be pushed out beyond the second cutting unit to form a free end of the second fiber tape which can be fixed on the application surface of the application device.

17. The production system according to claim 1, wherein a plurality of roll-out devices are provided, wherein the plurality of roll-out devices are arranged in rows on the laying device, and wherein each row contains at least two of the roll-out devices.

18. The production system according to claim 17, wherein the laying device comprises a plurality of guide rails, wherein the at least two of the roll-out devices of each row are disposed on a respective guide of the plurality of guide rails, wherein each guide rail is configured to be pulled out sideways of the laying device so that each row of the at least two of the roll-out devices can be respectively pulled sideways out of the laying device.

19. The production system according to claim 1, wherein a plurality of roll-out devices and a plurality of fiber tapes having a fiber tape width are provided, wherein the plurality of roll-out devices are arranged in n rows, where n corresponds to the number of rows, wherein each row contains at least two of the roll-out devices, wherein each roll-out device of the plurality of roll-out devices has a module width corresponding to the fiber tape width, wherein the roll-out devices in each row are disposed at an (n−1)-times distance of the module width from the roll-out devices in another row.

20. The production system according to claim 1, wherein the first and second sub-regions of the application surface of the application device can be moved relative to one another and independently of one another in the longitudinal extension of the application surface and the first and second roll-out devices are disposed on the laying device in a stationary arrangement relative to the longitudinal extension of the application surface.

21. The production system according to claim 1, wherein the first sub-region of the application surface of the application device is disposed on a first application profile which can be moved in a horizontal direction relative to a base frame of the application device and the first application profile is coupled with the base frame by a linear guide and wherein the second sub-region of the application surface of the application device is disposed on a second application profile which can be moved in the horizontal direction relative to the base frame of the application device and the second application profile is coupled with the base frame by the linear guide.

22. The production system according to claim 1, further comprising an application profile, wherein the application profile is connected to a toothed belt and a first end section of the toothed belt is connected to a first end section of the application profile and a second end section of the toothed belt is connected to a second end section of the application profile and the application profile and the toothed belt form a continuous loop and the toothed belt engages with a drive unit.

23. The production system according to claim 1, wherein the first sub-region has a first sub-region width, the second sub-region has a second sub-region width, the first tape has a first fiber tape width, and the second tape has a second fiber tape width, and the first sub-region width is the same size as or slightly smaller than the first fiber tape width of and the second sub-region width is the same size or slightly smaller than the second fiber tape width.

24. The production system according to claim 1, wherein orifices are provided in the application surface of the application device which are air-permeable and can be coupled with a device for generating negative pressure.

25. The production system according to claim 1, wherein the application surface of the application device is curved in at least certain regions.

26. The production system according to claim 1, further comprising a first downholder roll configured to press the first fiber tape against the application surface of the application device and a second downholder roll configured to press the second fiber tape against the application surface of the application device.

27. The production system according to claim 1, further comprising third and fourth roll-out devices, wherein the application device has a first machine side with the first and second application profiles and the first and second roll-out devices co-operating therewith and a second machine side having third and fourth application profiles and the third and fourth roll-out devices co-operating therewith, and the first and second application profiles of the first machine side and the third and fourth application profiles of the second machine side can be moved to engage with one another in a meshing arrangement in a machine center.

28. The production system according to claim 1, wherein at least one of the first cutting unit and the first clamping unit is mounted on the first roll-out device so as to be movable by the first linear guide and the first cutting unit and the first clamping unit can be moved relative to one another, as a result of which the first fiber tape clamped in the first clamping unit can be pushed forward out beyond the first cutting unit to form a free end which can be fixed on the application surface to enable unreeling from the first raw material roll by the application surface.

29. A method for laying fiber tapes, using the production system according to claim 1, wherein the method comprises the following method steps:
   providing the first fiber tape and the second fiber tape on a laying device having the first and second roll-out devices;
   applying the first fiber tape and the second fiber tape to the application surface and fixing the first fiber tape and the second fiber tape on the application surface, according to the width of the application device;
   unreeling the first fiber tape and the second fiber tape by relatively moving the first sub-region of the application surface and the first roll-out device and the second sub-region of the application surface and the second roll-out device, the first fiber tape and the second fiber tape being fixed on the application surface, as a result of which the first fiber tape is unreeled in strips onto the application surface due to the application surface pulling on the first fiber tape and the second fiber tape is unreeled in strips onto the application surface due to the application surface pulling on the second fiber tape; and
   cutting the first fiber tape to length by the first cutting unit of the first roll-out device and the second fiber tape to length by the second cutting unit of the second roll-out device, wherein the first fiber tape clamped in the first clamping unit is moved forwards beyond the first cutting unit to form a first free end which is fixed on the application surface so as to be pulled off the first raw material roll by the application surface and the second fiber tape clamped in the second clamping unit is moved forwards beyond the second cutting unit to form a second free end which is fixed on the application surface so as to be pulled off the second raw material roll by the application surface.

30. The method according to claim 29, wherein after cutting the first fiber tape to length, the following method steps are implemented:
   picking up the first fiber tape cut to length by a manipulation device for manipulating the first fiber tape applied to the application device;
   transferring the first fiber tape from the application device to a stacking device;
   applying the first fiber tape to an application surface of the stacking device to form a first fiber tape layer; and
   feeding in a second fiber tape layer and stacking the second fiber tape layer on top of the first fiber tape layer.

31. The method according to claim 30, wherein the application surface on the stacking device for receiving the first fiber tape is of an air-permeable design to which a negative pressure is applied so that the first fiber tape applied to the application surface of the stacking device is fixed thereon.

32. The method according to claim 31, wherein the first fiber tape is picked up by a receiving surface of the manipulation by the negative pressure applied and in order to transfer the first fiber tape from the application device to the manipulation device, the negative pressure applied to the application device is switched off.

33. The method according to claim 29, further comprising a third roll-out device comprising a third raw material roll having a third fiber tape disposed on the third raw material roll, wherein the first, second, and third roll-out devices are disposed adjacent to one another, and the first, second, and third rollout devices are connected to the laying device in a stationary arrangement, and according to the width of the application device, the application surface of the application device is divided into at least first, second, and third sub-regions, wherein the third sub-region is assigned to the third roll-out device, and the first, second and third sub-regions are provided on first, second, and third mutually parallel application profiles, and a pattern of the first, second, and third fiber tapes is formed by moving the first, second, and third application profiles independently of one another in the longitudinal extension of the application surface and thus pulling the respective first, second, and third fiber tapes off the first, second, and third raw material rolls, respectively.

34. The method according to claim 29, wherein in order to cut the first fiber tape, the first cutting unit of the first roll-out device is operated in a forward-fed cutting position and the first fiber tape is clamped by the first clamping unit and after cutting the first fiber tape, the first cutting unit and/or the first clamping unit are moved relative to one another together so that a cut end of the first fiber tape extends out from the first cutting unit.

35. The method according to claim 29, wherein in order to apply the first fiber tape to the application surface of the application device, the first fiber tape is clamped by the first clamping unit and then the first clamping unit and/or the first cutting unit are moved relatively towards one another, as a result of which the first fiber tape is pushed forwards beyond the first cutting unit so that the first free end of the first fiber tape is formed, and the first fiber tape is then fixed to the application surface of the application device so that the first fiber tape is received on the application surface of the application device so as to be non-movable relative thereto and unreeling from the first raw material roll can then continue by moving the application surface of the application device relative to the first roll-out device of the laying device.

36. The method according to claim 29, wherein in order to fix the first free end of the first fiber tape on the application surface of the application device, a vacuum is applied to the application surface and/or a first downholder roll is pressed onto the first fiber tape.

* * * * *

UNITED STATES PATENT AND TRADEMARK OFFICE
CERTIFICATE OF CORRECTION

PATENT NO. : 10,875,261 B2  
APPLICATION NO. : 15/774361  
DATED : December 29, 2020  
INVENTOR(S) : Danninger et al.

Page 1 of 1

It is certified that error appears in the above-identified patent and that said Letters Patent is hereby corrected as shown below:

In the Claims

In Claim 5, Line 1 (Column 20, Line 54), change "claim 2" to --claim 3--.
In Claim 23, Line 6 (Column 22, Line 49), please delete "of".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*